United States Patent
Oldeide

(10) Patent No.: US 11,661,978 B2
(45) Date of Patent: May 30, 2023

(54) PNEUMATIC CLUTCH ACTUATOR WITH SELF-ADJUSTMENT MECHANISM

(71) Applicant: KA Group AG, Zürich (CH)

(72) Inventor: Christer Kobbevik Oldeide, Kongsberg (NO)

(73) Assignee: KA Group AG, Zürich (CH)

( * ) Notice: Subject to any disclaimer, the term of this patent is extended or adjusted under 35 U.S.C. 154(b) by 39 days.

(21) Appl. No.: 17/602,549

(22) PCT Filed: Apr. 13, 2020

(86) PCT No.: PCT/IB2020/053475
§ 371 (c)(1),
(2) Date: Oct. 8, 2021

(87) PCT Pub. No.: WO2020/208611
PCT Pub. Date: Oct. 15, 2020

(65) Prior Publication Data
US 2022/0196086 A1 Jun. 23, 2022

Related U.S. Application Data

(60) Provisional application No. 62/833,556, filed on Apr. 12, 2019.

(51) Int. Cl.
*F16D 25/12* (2006.01)
*F16D 25/08* (2006.01)

(52) U.S. Cl.
CPC ......... *F16D 25/126* (2013.01); *F16D 25/083* (2013.01); *F16D 25/088* (2013.01); *F16D 2500/1028* (2013.01)

(58) Field of Classification Search
CPC .... F16D 25/083; F16D 25/088; F16D 25/126; F16D 13/75; F16D 13/752; F16D 13/755
(Continued)

(56) References Cited

U.S. PATENT DOCUMENTS

| 2,885,049 A | * | 5/1959 | Staadt | F16D 25/126 |
| | | | | 192/93 R |
| 3,946,845 A | * | 3/1976 | Kamio | F16D 13/752 |
| | | | | 192/70.252 |
| 2018/0073574 A1 | | 3/2018 | Winter et al. | |

FOREIGN PATENT DOCUMENTS

| DE | 1289689 B | * | 2/1969 | ........... F16D 25/126 |
| EP | 2683960 A1 | | 1/2014 | |

(Continued)

OTHER PUBLICATIONS

International Search Report for Application No. PCT/IB2020/053475 dated Jul. 2, 2020, 4 pages.

*Primary Examiner* — Richard M Lorence
(74) *Attorney, Agent, or Firm* — Howard & Howard Attorneys PLLC

(57) ABSTRACT

A pneumatic clutch actuator is described herein. The pneumatic clutch actuator includes a piston housing and a piston slidably received within the piston housing and configured to selectively change a clutch state between an engaged state and a disengaged state. The piston includes a self-adjustment mechanism that is configured to adjust an axial length of the piston. The self-adjustment mechanism includes a position locking assembly that includes a locking member and a positioning member. The locking member includes a plurality of locking flanges spaced along an outer surface of the locking member. The positioning member includes a plurality of positioning slots that are spaced along the positioning member. The position locking assembly is positionable between an unlocked state with the locking member spaced a distance from the positioning member, and a locked state with at least one locking flange inserted into a corresponding positioning slot.

22 Claims, 18 Drawing Sheets

(58) Field of Classification Search
USPC .................................................. 192/85.62
See application file for complete search history.

(56) References Cited

FOREIGN PATENT DOCUMENTS

| WO | 2012119612 A1 | 9/2012 |
| WO | 2017191506 A2 | 11/2017 |
| WO | 2020208611 A1 | 10/2020 |

* cited by examiner

PNEUMATIC CLUTCH ACTUATOR WITH SELF-ADJUSTMENT MECHANISM

CROSS-REFERENCE TO RELATED APPLICATION

This application is the National Stage of International Patent Application No. PCT/IB2020/053475, filed Apr. 13, 2020, which claims priority to U.S. Provisional Application No. 62/833,556, filed Apr. 12, 2019, the disclosure of which is hereby incorporated by reference in its entirety for all purposes.

FIELD OF THE INVENTION

The present invention relates to a pneumatic clutch actuator and a self-adjustment mechanism for use with a pneumatic clutch actuator.

BACKGROUND

Motor vehicles are commonly provided with a clutch actuator that is connected to a clutch assembly. The clutch assembly is configured to selectively separate frictionally coupled elements and to transfer energy from a power source, such as an engine output shaft, to a transmission input shaft. The clutch assembly is configured to move between an engaged state and a disengaged state. The clutch assembly includes a clutch disc having a friction surface. The clutch disc friction surface engages a flywheel that is operatively connected to the engine output shaft. The engine output shaft is operatively coupled to the transmission input shaft while the clutch assembly is in the engaged state. The clutch disc friction surface is disengaged from the flywheel such that the engine output shaft is operatively decoupled from the transmission input shaft, while the clutch assembly is in the disengaged state.

The selective engagement and disengagement of the clutch assembly may be accomplished by the clutch actuator. The clutch actuator moves the clutch disc friction surface between engagement and disengagement with the flywheel. Over time, the clutch disc friction surface wears and becomes thinner leading to an increased distance of travel for the clutch disc friction surface to the flywheel.

The present invention is aimed at one or more of the problems identified above.

SUMMARY OF THE INVENTION

Accordingly, the present invention provides an adjustment mechanism to automatically compensate for the wear of the clutch disc friction surface during operation.

In one embodiment of the present invention, a pneumatic clutch actuator is provided. The pneumatic clutch actuator includes a piston housing and a piston slidably received within the piston housing and configured to selectively change a clutch state between an engaged state and a disengaged state. The piston includes a self-adjustment mechanism that is configured to adjust an axial length of the piston. The self-adjustment mechanism includes a position locking assembly that includes a locking member and a positioning member. The locking member includes a plurality of locking flanges spaced along an outer surface of the locking member. The positioning member includes a plurality of positioning slots that are spaced along the positioning member. Each positioning slot is configured to receive a locking flange therein. The position locking assembly is positionable between an unlocked state with the locking member spaced a distance from the positioning member, and a locked state with at least one locking flange inserted into a corresponding positioning slot.

In one embodiment of the present invention, a method of operating a pneumatic clutch actuator to selectively change a clutch state between an engaged state and a disengaged state is provided. The pneumatic clutch actuator includes a piston housing and a piston slidably received within the piston housing. The piston includes a self-adjustment mechanism for adjusting an axial length of the piston. The self-adjustment mechanism includes a position locking assembly. The method includes channeling compressed air into the piston housing to cause the piston to move from a first position to a second position and moving the position locking assembly to a locked state to fix an axial length of the piston as the piston moves from the first position. The method also includes releasing compressed air from the piston housing to cause the piston to move from the second position to the first position, and moving the position locking assembly to an unlocked state to facilitate adjusting the axial length of the piston as the piston moves toward the first position.

BRIEF DESCRIPTION OF THE FIGURES

Other features, advantages and details appear, by way of example only, in the following detailed description of embodiments, the detailed description referring to the drawings in which.

DETAILED DESCRIPTION

Figure 1:
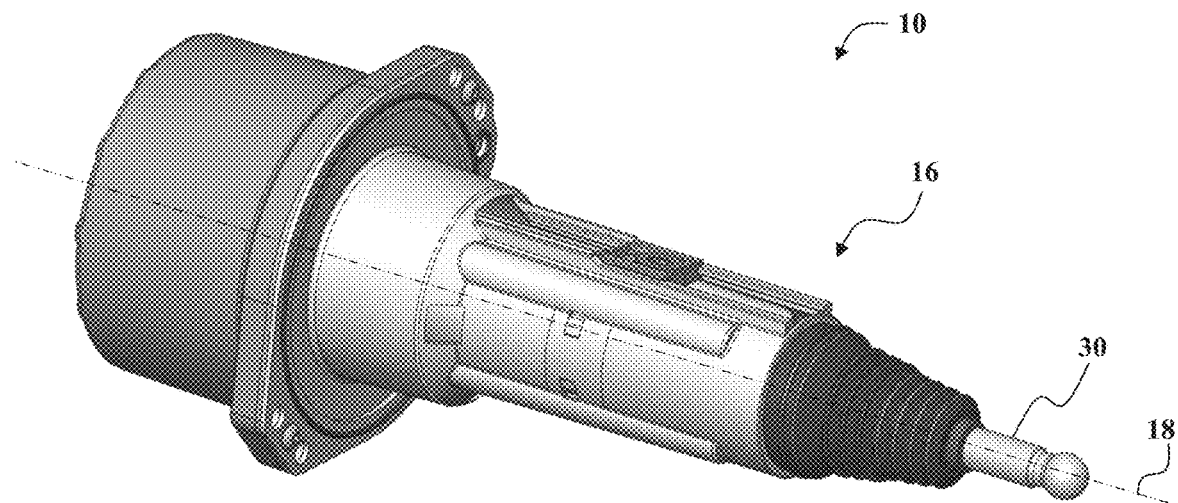
FIG. 1 is a perspective view of a pneumatic clutch actuator including a self-adjustment adjustment mechanism, according to an embodiment of the present invention.
Figure 2:
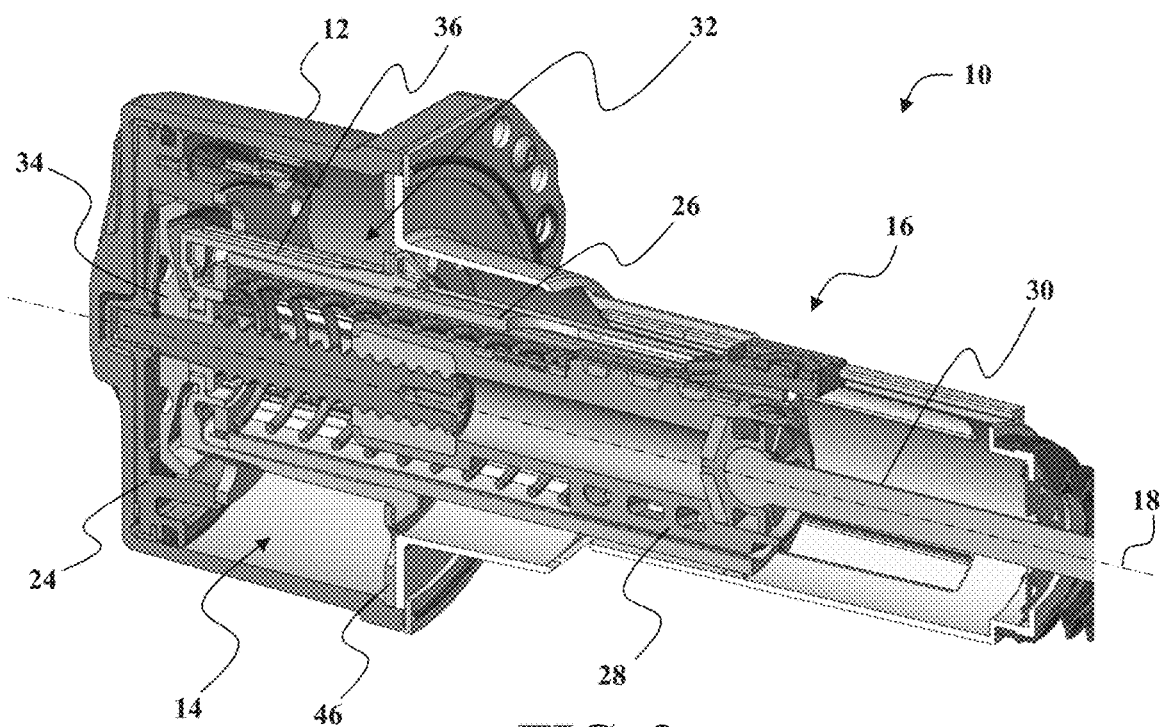
FIGS. 2 and 3 are partial cross-sectional views of the pneumatic clutch actuator shown in FIG. 1.
Figure 3:
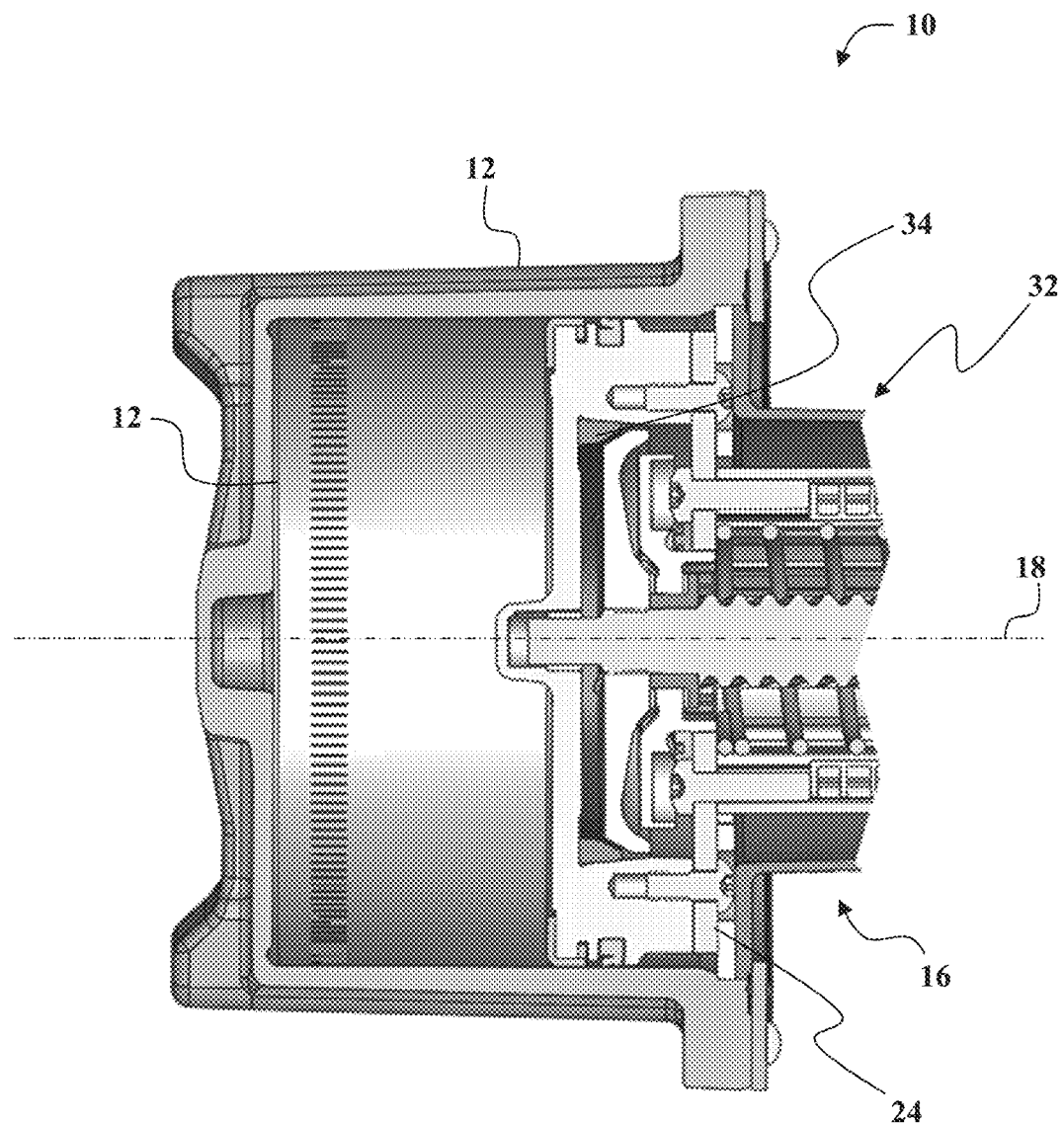
Figure 4:
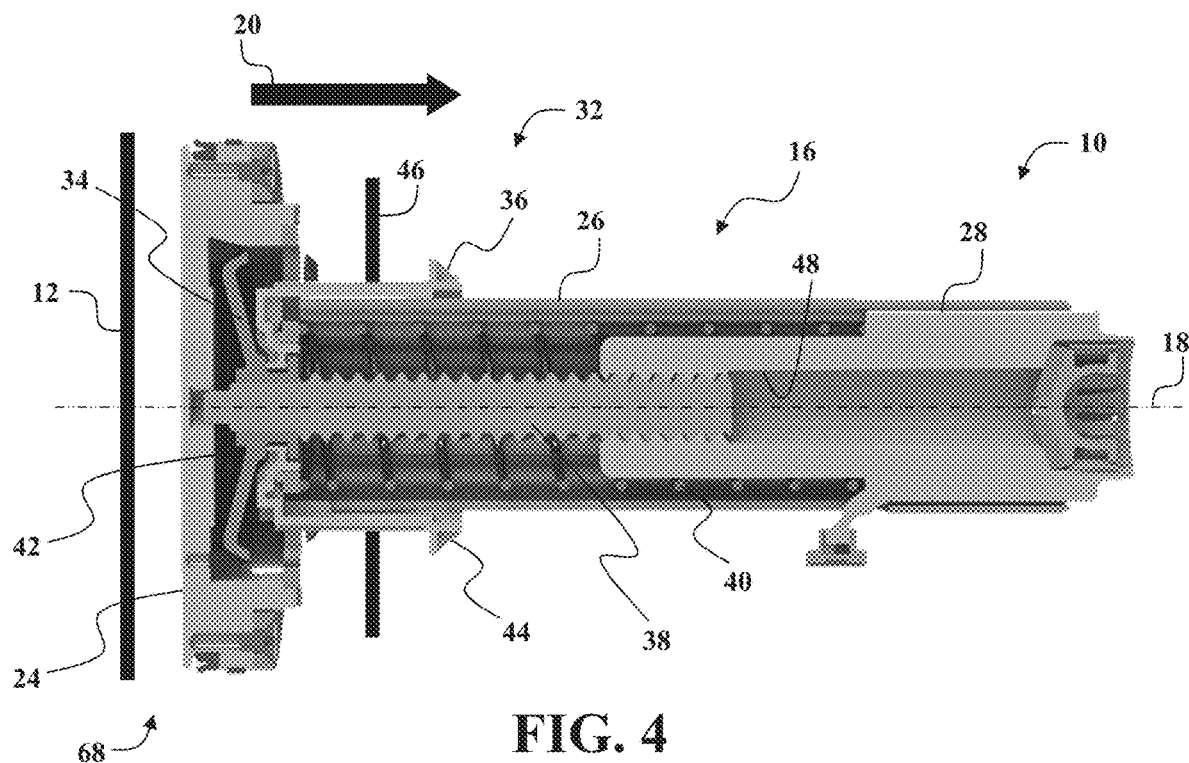
FIG. 4 is a partial cross-sectional view of the pneumatic clutch actuator shown in FIG. 1, with the pneumatic clutch actuator in an extended position.
Figure 5:
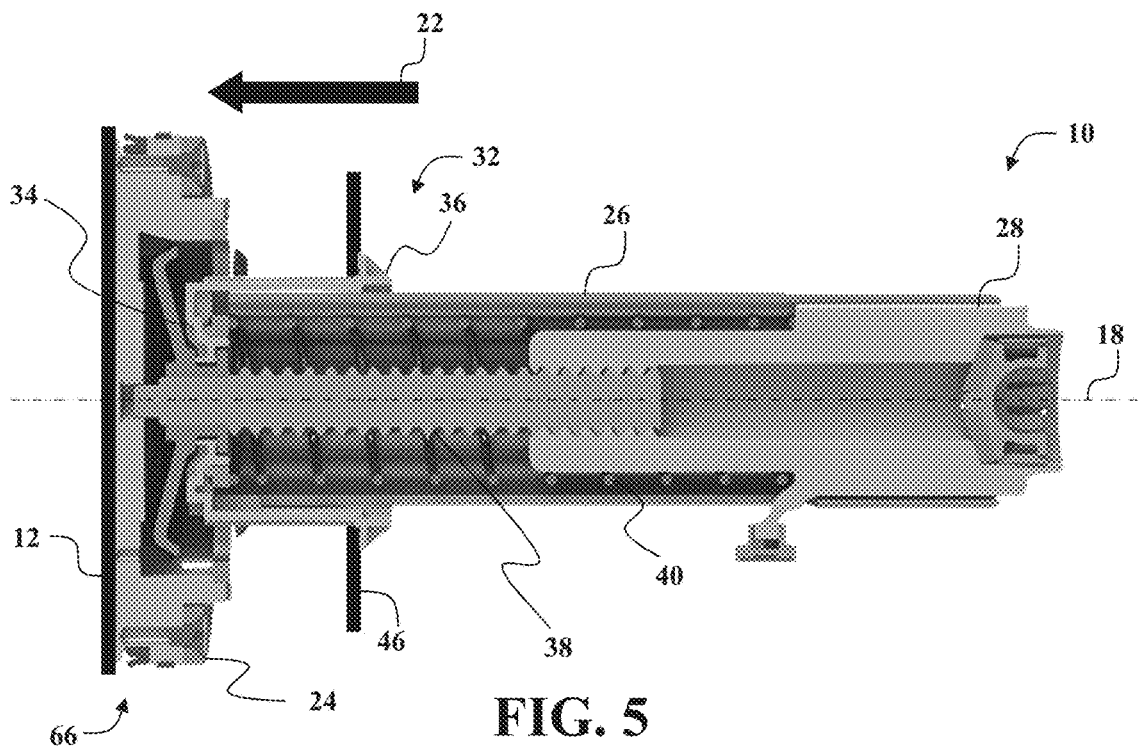
FIG. 5 is a partial cross-sectional view of the pneumatic clutch actuator shown in FIG. 1, with the pneumatic clutch actuator in a retracted position.

The following description is merely exemplary in nature and is not intended to limit the present disclosure, its application or uses. It should be understood that throughout the drawings, corresponding reference numerals indicate like or corresponding parts and features.

The illustrated embodiments describe a self-adjustment mechanism for clutch actuator that solves the problem of the incremental adjustment for clutch ware, by adjusting actuation in clutch actuator. No friction needed to hold position, total resistance to lubrication and temperature. In one embodiment, the self-adjustment mechanism is configured as an inclined stepped ramp, the adjustment occurs when pressure is applied to the piston and the torsion/compression spring is compressed until the ramps meets. The holding function consist of an array of upset steps on the ramp nearest the piston, these will engage with the opposite ramp, having corresponding cutouts to constrain the position, both rotational and linear between piston and clutch bearing. The release and adjust function occurs when the piston is relaxed, and the torsion/compression spring pull/rotate the ramp apart. The adjustment is due to clutch wear. A linear/rotate movement move the cutout ramp closer to the piston and thereby provide the same nominal distance for piston to travel at all time.

FIGS. 1-10 illustrates a pneumatic clutch actuator 10 according to another embodiment of the present invention. In the illustrated embodiment, the pneumatic clutch actuator 10 includes a piston housing 12, a pneumatic cylinder 14, a piston 16 slidably received therein to define a chamber which is selectively connectable to a pressure fluid source (not shown) through an opening in the cylinder end wall to facilitate pressurization and depressurization of the chamber by supplying or exhausting pressurized fluid. For example, the piston 16 is moved along a piston axis 18 in a first direction 20 (shown in FIG. 4) upon pressurization of the chamber of the pneumatic cylinder 14, and is moved along the piston axis 18 in an opposite second direction 22 (shown in FIG. 5) upon depressurization of the chamber. The piston 16 includes piston assembly 24, an axial tubular extension 26 extending outwardly from the piston assembly 24, and a mounting member 28 which is disposed within an end portion of the tubular extension 26. The mounting member 28 is held in the end portion of the tubular extension 26 such that any rotational movement of the mounting member is prevented, whereas an axial movement in the axial direction of tubular extension 26 is possible. The mounting member 28 acts on a push rod 30 which extends to the vehicle clutch.

A self-adjustment mechanism 32 is coupled between the piston assembly 24 and the mounting member 28 for adjusting an axial distance between the piston assembly 24 and the mounting member 28. In the illustrated embodiment, the self-adjustment mechanism 32 includes a position locking assembly 34, a tubular positioning member 36, a lead screw 38, and a biasing spring 40. The position locking assembly 34 is positioned within a chamber 42 defined within the piston assembly 24. The tubular positioning member 36 is coupled to the position locking assembly 34 and defines a cavity that is sized and shaped to receive the tubular extension 26 therein such that the tubular positioning member 36 is disposed about a radial outer surface of the tubular extension 26. The tubular positioning member 36 includes a plurality of positioning flanges 44 that are sized and shaped to contact a fixed interior wall 46 that is disposed within the piston housing 12. The lead screw 38 is coupled to the position locking assembly 34 and disposed within the axial tubular extension 26. The lead screw 38 extends outwardly from the position locking assembly 34 and extends into a threaded internal cavity 48 of the mounting member 28. The biasing spring 40 is disposed within the tubular extension 26 and is configured to bias the mounting member 28 and push rod 30 away from the piston assembly 24. One exemplary pneumatic clutch actuator that can be utilized with the self-adjustment mechanism 32 is described in International Patent Application Publication No. WO 2012/119612, entitled "Self-Adjusting Clutch Actuator for Operating A Vehicle Clutch", which is hereby incorporated herein by reference in its entirety.

Referring to FIGS. 6-10, in the illustrated embodiment, the position locking assembly 34 includes a positioning member 50 including a positioning ring 52 and a locking member 54 including a locking disk 56. The positioning ring 52 is orientated between the locking disk 56 and the tubular extension 26 (shown in FIG. 5). The positioning ring 52 includes a plurality of positioning slots 58 that are defined along a radial inner surface of the positioning ring 52. The plurality of positioning slots 58 are spaced about a circumference of the radial inner surface. In the illustrated embodiment, the positioning ring 52 is fixedly coupled to the tubular positioning member 36 (shown in FIG. 5) to prevent a rotation of the positioning ring 52 about the piston axis 18. In another embodiment, the positioning ring 52 is fixedly coupled to the piston assembly 24 (shown in FIG. 5) to prevent a rotation of the positioning ring 52 about the piston axis 18.

The locking disk 56 includes a plurality of locking flanges 60 that extend outwardly from an outer surface of the locking disk 56 and towards the positioning ring 52. The plurality of locking flanges 60 are spaced along a circumference of the locking disk 56 and are each sized and shaped to be received within each positioning slot 58. In one embodiment, the number of positioning slots 58 defined within the positioning ring 52 is greater than the number of locking flanges 60 included with the locking disk 56. In other embodiments, the number of positioning slots 58 may the less than, or equal to, the number of locking flanges 60.

Figure 6:
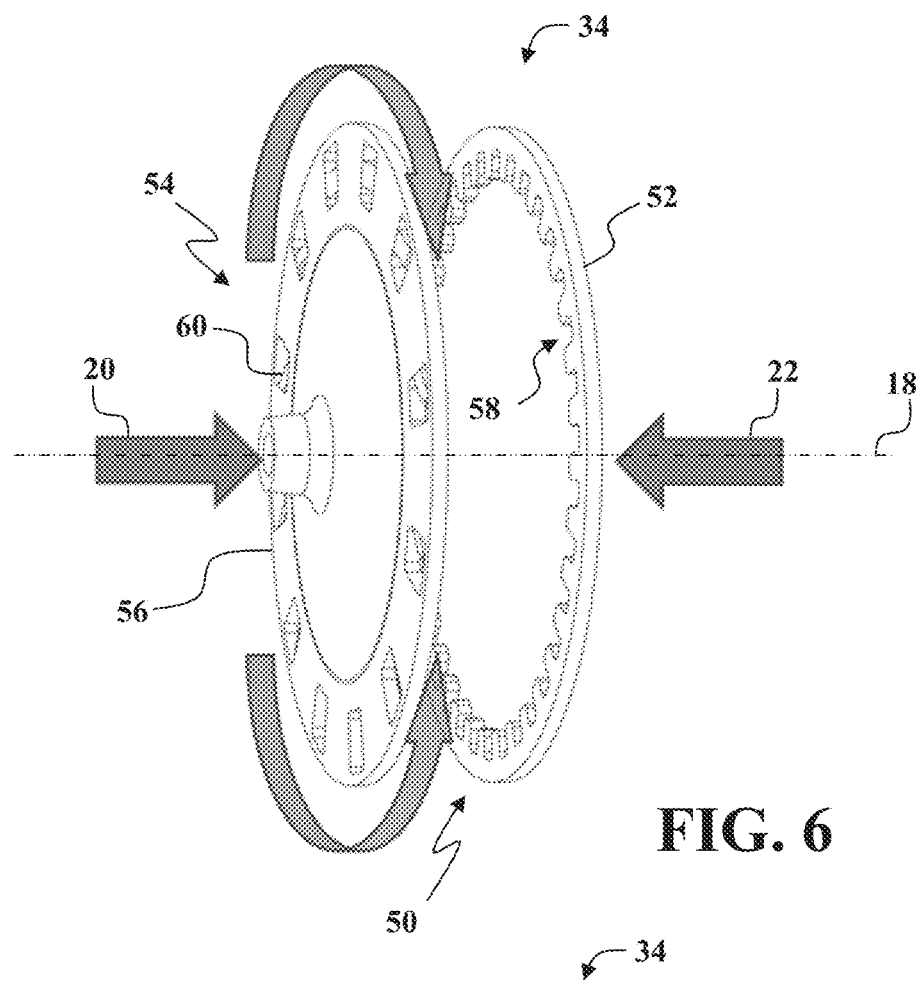
FIGS. 6 and 7 are perspective views of a position locking assembly that may be used with the self-adjustment adjustment mechanism shown in FIGS. 1-5, according to embodiments of the present invention.
Figure 7:
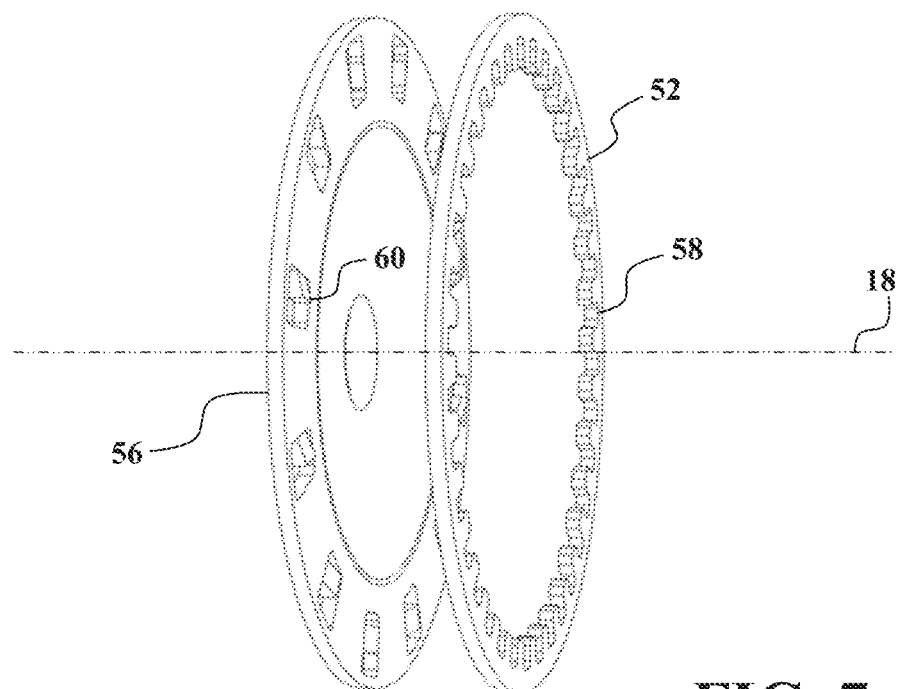
Figure 8:
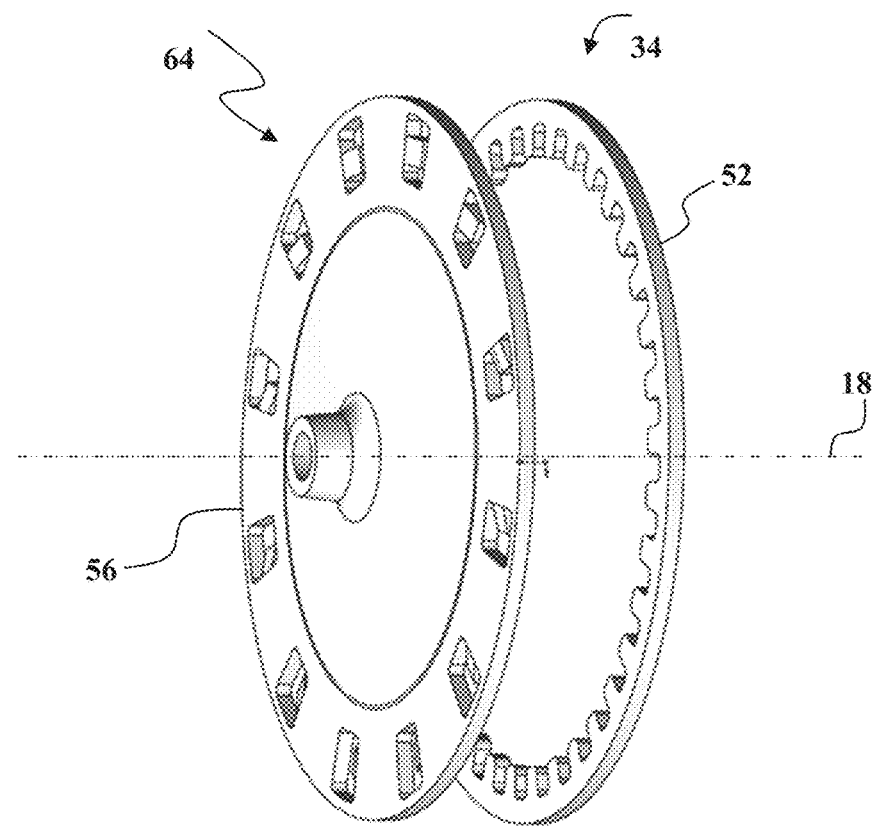
FIG. 8 is a perspective view of the position locking assembly shown in FIG. 6, with the position locking assembly in an unlocked state.
Figure 9:
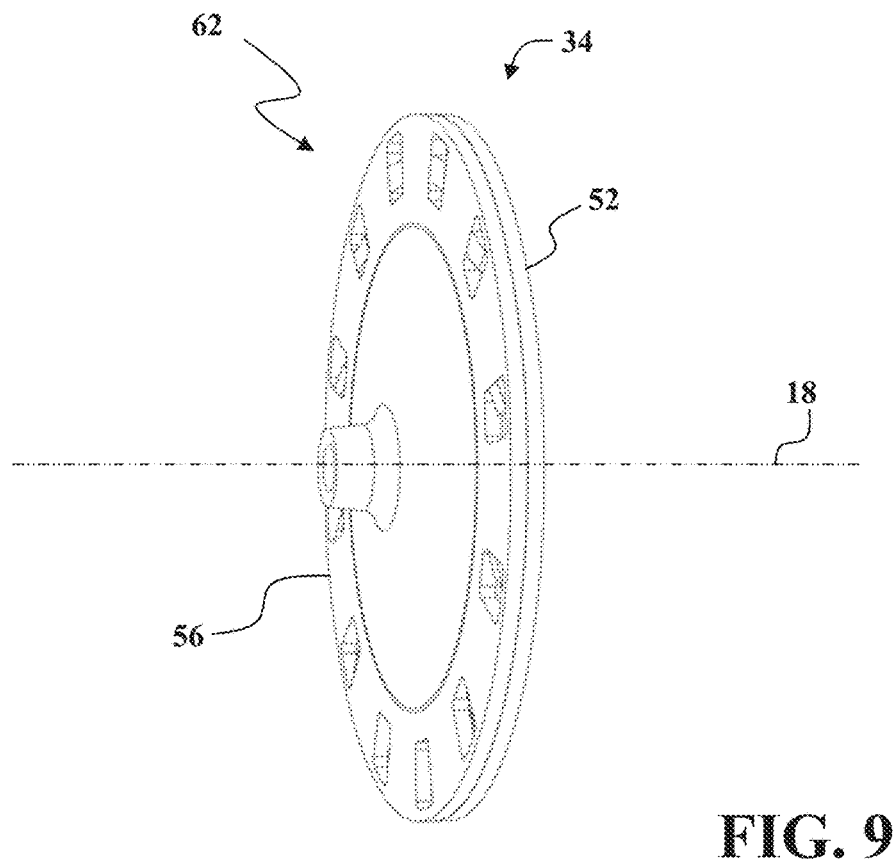
FIG. 9 is a perspective view of the position locking assembly shown in FIG. 6, with the position locking assembly in a locked state.
Figure 10:
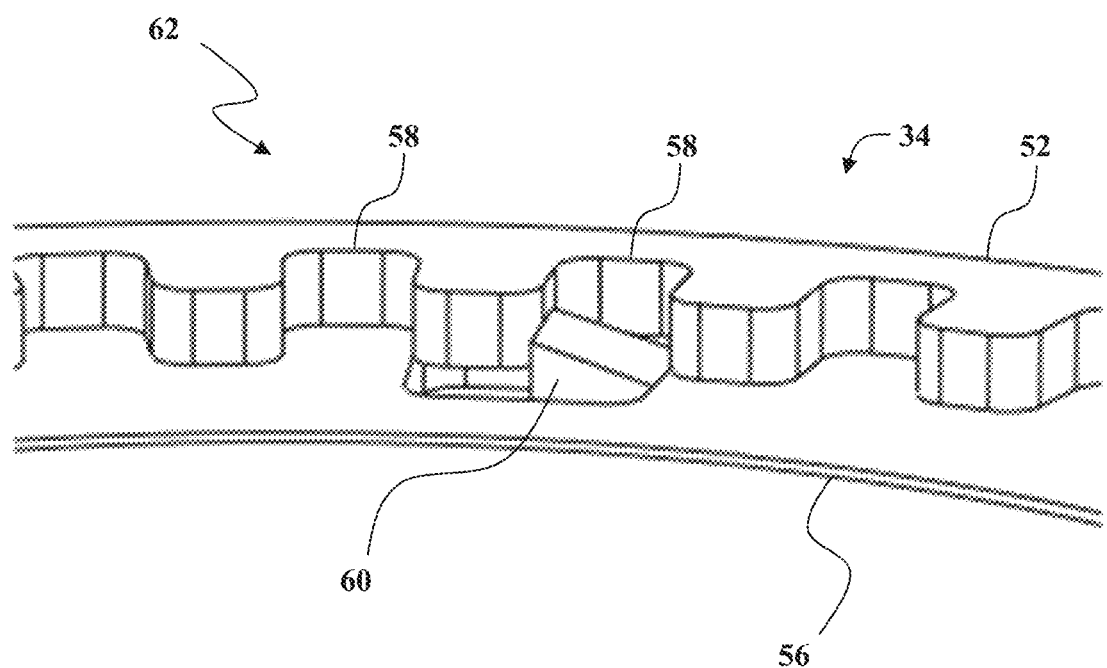
FIG. 10 is an enlarged perspective view of a portion of the position locking assembly shown in FIG. 6.

The position locking assembly 34 is positionable between a locked state 62 (shown in FIG. 9) and an unlocked state 64 (shown in FIG. 8). In the locked state 62 each locking flange 60 is inserted into a corresponding positioning slot 58 (shown in FIG. 10) such that the locking flanges 60 contact the inner surfaces of the corresponding positioning slots 58 to couple the locking disk 56 to the positioning ring 52 to resist a rotation of the locking disk 56 with respect to the positioning ring 52. In the unlocked state 64, the locking disk 56 is spaced an axial distance from the positioning ring 52 to enable the locking disk 56 to rotate with respect to the positioning ring 52 about the piston axis 18 (as shown in FIG. 6).

The vehicle clutch is normally biased to its engaged position. The bias force acting on the clutch urging it to its normally engaged position is acting, via push rod 30 and the mounting member 28, on the piston 16 such that depressurization of the chamber of the pneumatic cylinder 14 causes that the bias force of the clutch to move the push rod 30 and piston 16 in the second direction 22 so that piston 16 reaches its end stop position in which the bias force from the vehicle clutch and a first force from a biasing spring 40 acting between the mounting member 28 and the piston assembly 24 are in equilibrium. Pressurization of the chamber of the pneumatic cylinder 14 causes the piston 16 to move the push rod 30 in the first direction 20 to disengage the clutch. Overtime, wear on the clutch disk may require a greater travel distance to move the push rod 30 and piston 16 in the second direction 22 such that clutch is engaged with the piston 16 positioned at its end stop position. The self-adjustment mechanism 32 operates to reduce the axial length of the piston 16 by reducing the axial distance between the mounting member 28 and the piston assembly 24.

For example, during operation, when the chamber of the pneumatic cylinder 14 is pressurized to cause the piston 16 to move the push rod 30 in the first direction 20, piston assembly 24 moves the locking disk 56 to engage the positioning ring 52 to operate the position locking assembly 34 in the locked state 62 as the piston 16 is moves in the first direction 20. As the chamber of the pneumatic cylinder 14 is depressurized to cause the piston 16 to move in the second direction 22, the tubular positioning member 36 contacts the fixed interior wall 46 to prevent additional axial movement of the positioning ring 52 in the second direction 22. With the positioning ring 52 in a fixed axial position, the push rod 30 continues to move the mounting member 28, lead screw 38, locking disk 56 and piston assembly 24 along the piston axis in the second direction 22. As the locking disk 56 continues to move in the second direction, the locking disk 56 decouples from the positioning ring 52 and moves the position locking assembly 34 to the unlocked state 64. With the position locking assembly 34 in the unlocked state, the locking disk 56 and lead screw 38 are able to rotate about the piston axis 18. As the piston assembly 24 reaches the end stop position, the mounting member 28 continues to move in the second direction 22 causing the lead screw 38 and locking disk 56 to rotate about the piston axis 18, which enables the mounting member 28 to move axially towards the piston assembly 24 to reduce the axial length of the piston 16, and increase the travel distance required to move the piston 16 to enable the clutch to engage. As the chamber of the pneumatic cylinder 14 is pressurized, the piston assembly 24 moves in the first direction 20, causing the locking disk 56 to engage the positioning ring 52 to operate the position locking assembly 34 in the locked state 62 and to prevent a rotation of the lead screw 38 to fix the axial length of the piston 16 as the piston 16 operates to disengage the clutch.

In some embodiments, the present invention includes a method of operating the pneumatic clutch actuator 10 to selectively change a clutch state between an engaged state and a disengaged state. The method includes channeling compressed air into the piston housing 12 to cause the piston 16 to move in the first direction 20 from a first position 66 (shown in FIG. 5) to a second position 68 (shown in FIG. 4), and moving the position locking assembly 34 to the locked state 62 to fix the axial length of the piston 16 as the piston 16 moves from the first position 66. The method also includes releasing compressed air from the piston housing 12 to cause the piston 16 to move in the second direction 22 from the second position 68 to the first position 66, and moving the position locking assembly 34 to the unlocked state 62 to facilitate adjusting the axial length of the piston 16 as the piston 16 moves toward the first position 66.

The method may also include moving the locking disk 56 into contact with the positioning ring 52 to move the position locking assembly 34 to the locked state 62, and moving the locking disk 56 away from the positioning ring 52 to move the position locking assembly 34 to the unlocked state 62. The method may also include inserting at least one locking flange 60 into a corresponding positioning slot 58 to move the position locking assembly 34 to the locked state 62. The method may also include rotating the locking disk 56 with respect to the positioning ring 52 as the piston 16 moves towards the first position 66. The method may also include rotating the locking disk 56 and the lead screw 38 with respect to the mounting member 28 as the piston 16 moves towards the first position 66 to adjust the axial length of the piston 16.

Referring to FIGS. 11-27, vehicles are commonly provided with a clutch assembly 100 to selectively couple rotating components or shafts. The clutch assembly 100 includes a clutch 102 that selectively engages a flywheel 104 to selectively couple and decouple the rotating components. The clutch 102 includes a clutch disc 106 having a friction surface that is attached to a transmission input shaft 108. The clutch disc 106 rotates with the transmission input shaft 108 and is configured to slide axially along the transmission input shaft 108. The friction surface of the clutch disc 106 is pressed by a diaphragm spring 110 through a pressure plate 112 against a face of the flywheel 104.

Figure 11:
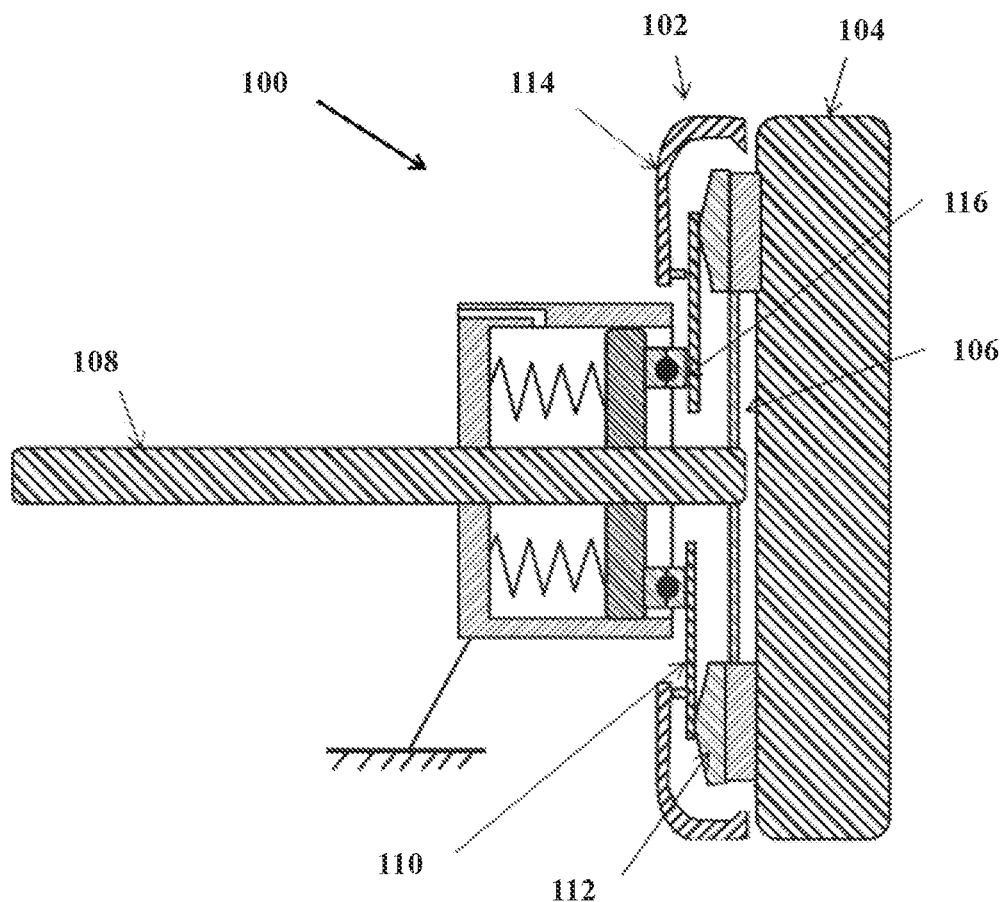
FIG. 11 is a partial cross-sectional view of a clutch assembly having a pneumatic clutch actuator in an engaged state when a piston assembly is in a first position.
Figure 12:
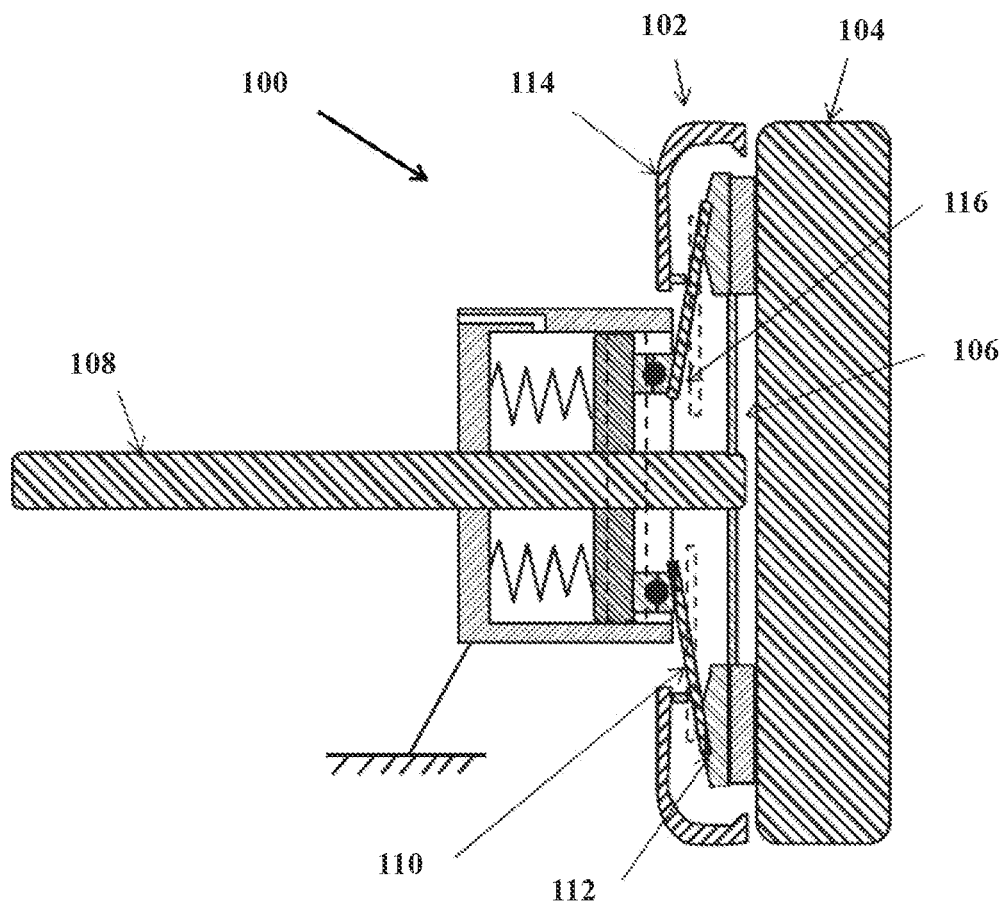
FIG. 12 is a partial cross-sectional view of the clutch assembly having the pneumatic clutch actuator in a disengaged state when the piston assembly is in a second position.

The diaphragm spring 110 is pivotally mounted to a clutch cover 114 that receives the clutch 102, the diaphragm spring 110, the pressure plate 112, as well as other components. The diaphragm spring 110 is arranged such that an axial force that is provided via a thrust bearing 116 to the diaphragm spring 110 moves the pressure plate 112 towards the clutch disc 106 to engage the friction surface with the face of the flywheel 104 when a piston assembly of a pneumatic clutch actuator is in a first position, as shown in FIG. 11. The diaphragm spring 110 is arranged such that an axial force that is applied via the piston assembly of the pneumatic clutch actuator moving from the first position toward the second position moves the diaphragm spring 110 to move the pressure plate 112 and ultimately the friction surface of the clutch disc 106 away from the face of the flywheel to disengage the clutch assembly 100, as shown in FIG. 12.

Figure 13:
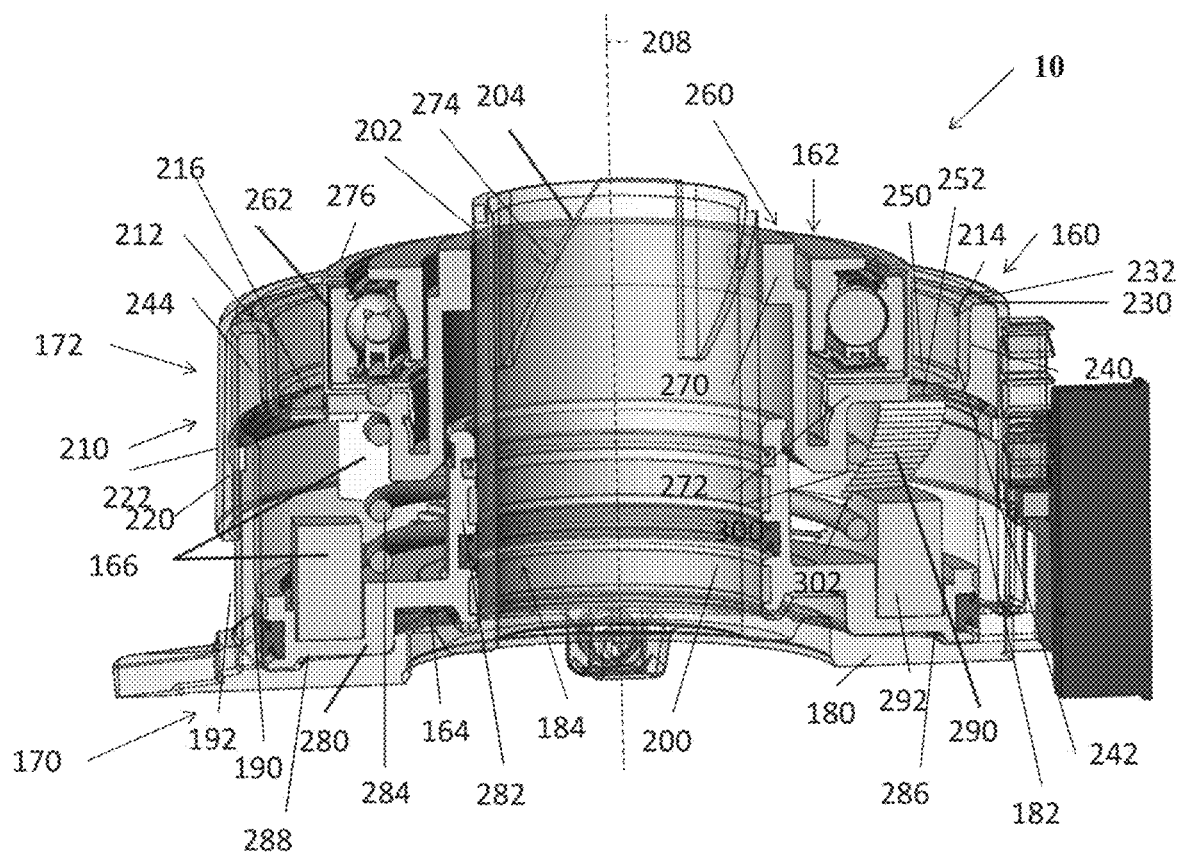
FIG. 13 is a partial cross-sectional view of the pneumatic clutch actuator having a self-adjustment adjustment mechanism, according to an embodiment of the present invention.

In accordance with an exemplary embodiment of the invention, another embodiment of a pneumatic clutch actuator 10 is illustrated in FIGS. 13-27. A partial cross-sectional view of the pneumatic clutch actuator 10 is shown in FIG. 13. The pneumatic clutch actuator 10 is configured to selectively change the state of the clutch 102 of the clutch assembly 100 that is operatively connected to the pneumatic clutch actuator 10 between an engaged state and a disengaged state. The pneumatic clutch actuator 10 includes a housing assembly 160, a bearing assembly 162, a piston assembly 164, and a self-adjustment mechanism 166.

The housing assembly 160 is circumferentially disposed about the transmission input shaft 108 and is configured as an annular housing. The housing assembly 160 includes a first housing member 170 and a second housing member 172. The first housing member 170 is at least partially received within the second housing member 172.

The first housing member 170 includes a base 180, a first annular wall 182, and a center post 184. The first annular wall 182 extends from the base 180 and is disposed substantially perpendicular thereto. The first annular wall 182 includes an inner surface 190 and an outer surface 192.

The center post 184 extends axially from the base 180 and is spaced apart from the first annular wall 182. The center post 184 extends from the base 180 towards and through the second housing member 172. The center post 184 is disposed substantially concentric with the first annular wall 182 and includes a center post inner surface 200 and a center post outer surface 202. The center post inner surface 200 defines a bore within which the transmission input shaft 108 is received.

The center post 184 defines a ramp 204 disposed proximate a terminal end 206 of the center post 184. The ramp 204 is angled relative to an axis 208 of the transmission input shaft 108. The ramp 204 is defined in the center post outer surface 202.

The second housing member 172 includes an outer annular wall 210, an extension wall 212, an inner annular wall 214, and a shoulder 216. The outer annular wall 210 includes a second annular wall inner surface 220 and a second annular wall outer surface 222. The second annular wall inner surface 220 is disposed proximate to and faces towards the outer surface 192.

The extension wall 212 connects the outer annular wall 210 and the inner annular wall 214. The extension wall 212 is disposed substantially perpendicular to the outer annular wall 210 and is disposed substantially parallel to the base 180. The extension wall 212 includes an extension wall inner surface 230 and an extension wall outer surface 232.

The inner annular wall 214 extends from the extension wall 212 and is disposed substantially perpendicular thereto. The inner annular wall 214 is disposed substantially parallel to the outer annular wall 210 and includes a third annular wall inner surface 240 and a third annular wall outer surface 242. The second annular wall inner surface 220, the extension wall inner surface 230, and the third annular wall inner surface 240 define an annular cavity 244. In at least one embodiment, the annular cavity 244 is sized to at least partially receive the first annular wall 182.

The shoulder 216 extends radially inwardly from the inner annular wall 214 towards the center post 184. The shoulder 216 is disposed substantially perpendicular to the inner annular wall 214 and is disposed substantially parallel to the extension wall 212. The shoulder 216 includes a first shoulder surface 250 and a second shoulder surface 252. The first shoulder surface 250 faces away from the base 180. The second shoulder surface 252 faces towards the base 180.

The bearing assembly 162 is at least partially received within the housing assembly 160 and is disposed about the center post 184. The bearing assembly 162 includes a bearing carrier 260 and a bearing 262.

The bearing carrier 260 is slidably disposed about the center post 184. The bearing carrier 260 is slidably disposed about the center post outer surface 202. The bearing carrier 260 slides along the center post outer surface 202 in response to movement of the piston assembly 164 or in response to the application of a force or load onto the bearing assembly 162 by the diaphragm spring 110.

The bearing carrier 260 includes a first bearing carrier portion 270 and a second bearing carrier portion 272. The first bearing carrier portion 270 is disposed radially between the center post 184 and the bearing assembly 162 and is disposed substantially parallel to the center post 184. The first bearing carrier portion 270 includes a protrusion 274 that extends radially inwardly towards the axis 208 of the transmission input shaft 108. The protrusion 274 is configured to engage the ramp 204 and facilitates rotation of the piston assembly 164 relative to at least one of the second housing member 172 and the bearing assembly 162.

The second bearing carrier portion 272 extends from the first bearing carrier portion 270. The second bearing carrier portion 272 extends from the first bearing carrier portion 270 towards the inner annular wall 214. The second bearing carrier portion 272 is disposed radially inwardly and adjacent to the shoulder 216.

The bearing 262 is rotatably supported by the bearing carrier 260. The bearing 262 is disposed on the second bearing carrier portion 272. In at least one embodiment, a member 276 is disposed between the second bearing carrier portion 272 and the bearing 262. The member 276 is at least partially disposed about the bearing 262.

The bearing 262 may be configured as a release bearing. The bearing 262 may include an inner race and an outer race with at least one rolling element disposed between the inner race and the outer race.

The piston assembly 164 is slidably received within the first housing member 170. The piston assembly 164 is configured to selectively change a clutch state of a clutch 102 that engages the bearing assembly 162 between an engaged state and a disengaged state. The piston assembly 164 is movable between a first position 163 (shown in FIG. 15) and a second position 165 (shown in FIG. 16) in response to the application of compressed air provided from a pneumatic source. The first position 163 of the piston assembly 164 may correspond to the engaged state of the clutch 102 of the clutch assembly 100. The second position 165 of the piston assembly 164 may correspond to the disengaged state of the clutch 102 of the clutch assembly 100.

The piston assembly 164 includes a piston head 280 and an extension member 282. The piston head 280 is disposed adjacent to the base 180 when the piston assembly 164 is in the first position 163. Compressed air that is provided to the pneumatic clutch actuator 10 moves the piston assembly 164 from the first position 163 towards the second position 165. A bottom surface 286 of the piston head 280 is spaced apart from the base 180 when the piston assembly 164 is in the second position 165. The bottom surface of the piston head 280, the base 180, and the inner surface 190 define a volume 288 that receives the compressed air. The evacuation or releasing of the compressed air from the volume 288 enables the piston assembly 164 to move from the second position towards the first position, as shown in FIG. 13.

The extension member 282 extends axially from the piston head 280 towards the bearing assembly 162. At least a portion of the extension member 282 is disposed between the bearing carrier 260 and the center post 184. The extension member 282 is disposed about the center post 184. The extension member 282 is configured to engage the center post outer surface 202.

In at least one embodiment, a biasing member 284 extends between the piston head 280 and the bearing carrier 260. The biasing member 284 is configured to engage the piston head 280 and the second bearing carrier portion 272 to apply a preload to at least one of the piston assembly 164 and the bearing assembly 162.

A portion of the clutch assembly 100, such as a diaphragm spring 110, is configured to engage the bearing assembly 162. The diaphragm spring 110 operates to engage and/or disengage the clutch assembly in response to operation of the pneumatic clutch actuator 10 through the movement of the piston assembly 164 between the first position and the second position. The clutch 102 includes a clutch disc 106 that has a friction surface that may wear during operation to selectively engage or disengage the clutch assembly 100. As the friction surface of the clutch disc 106 of the clutch 102 wears, the piston assembly 164 may need to travel a greater distance between the second position (disengaged clutch assembly) and the first position (engaged clutch assembly) to enable the worn clutch disk 106 to engage the face of the flywheel 104. In an attempt to overcome these disadvantages, the self-adjustment mechanism 166 is provided to adjust an axial distance between the bearing assembly 162 and the piston assembly 164 to increase the travel distance of the piston assembly 164 when moving from the second position to the first position to enable the clutch disk 106 to engage the face of the flywheel 104, as the friction surface of the clutch disk 106 wears during operation. The self-adjustment mechanism 166 is configured to provide a compressive force between the piston assembly 164 and the bearing assembly 162 to maintain a predetermined distance or to adjust a distance there between.

Figure 14:
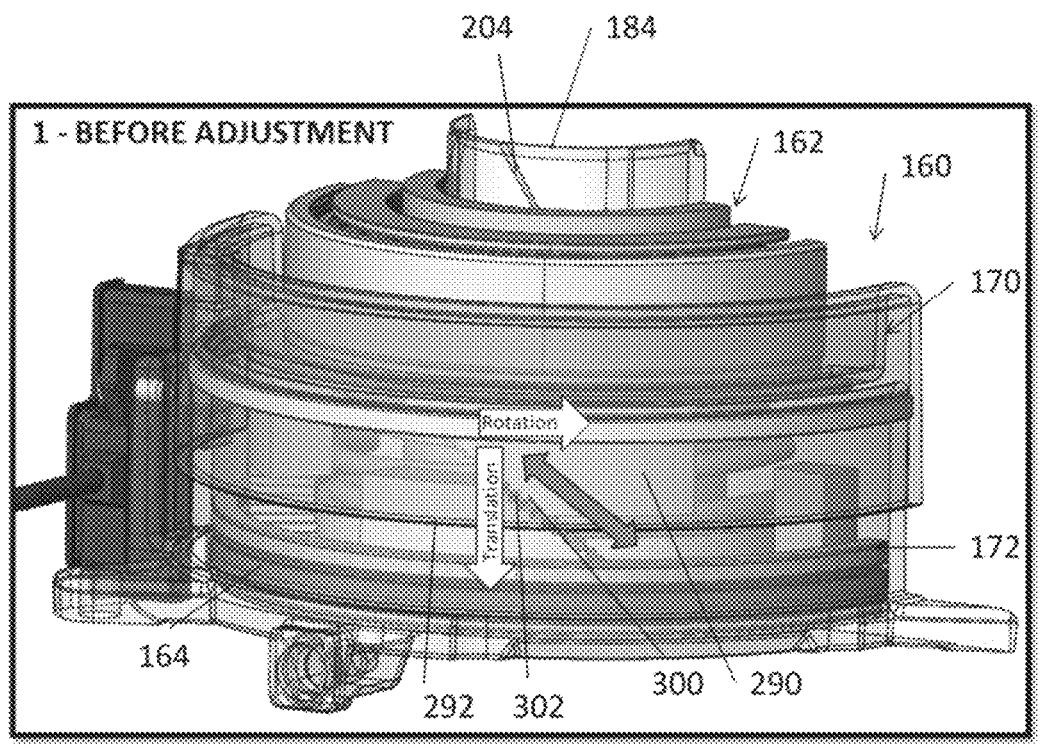
FIG. 14 is a partial cross-sectional view of the pneumatic clutch actuator of FIG. 13 having the self-adjustment adjustment mechanism before adjustment.
Figure 17:
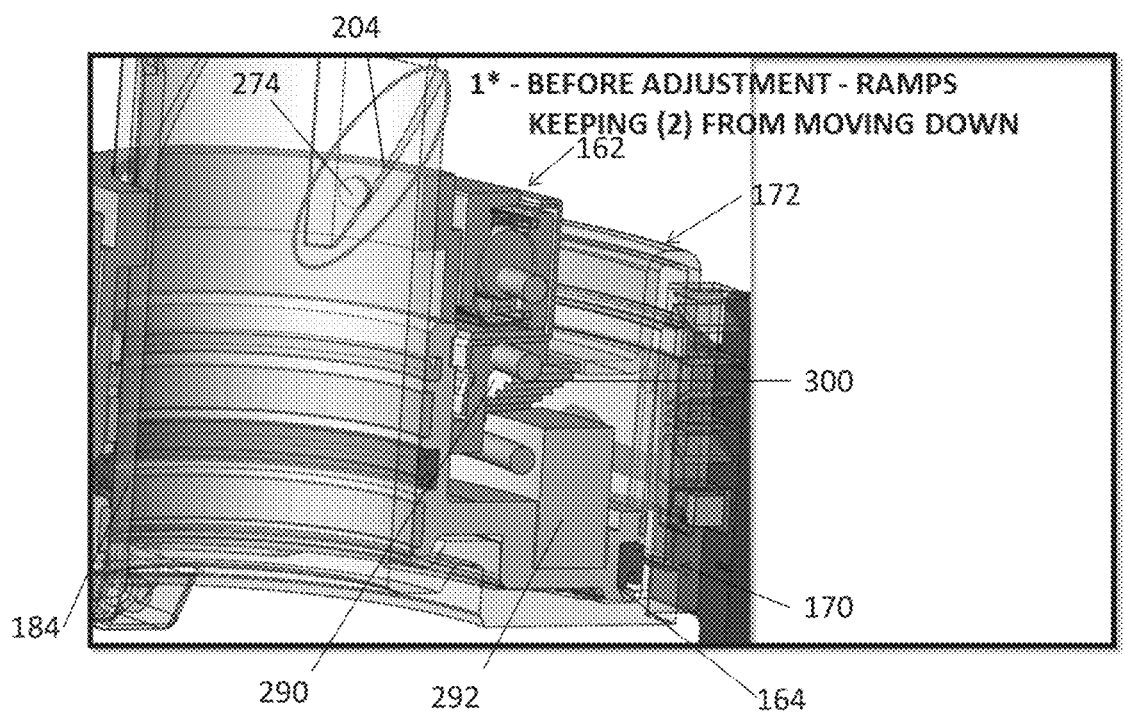
FIG. 17 is a partial cross-sectional view of the pneumatic clutch actuator of FIG. 13 having the self-adjustment adjustment mechanism before adjustment.

Referring to FIGS. 13, 14, and 17, the self-adjustment mechanism 166 includes a first adjustment member 290 and a second adjustment member 292. The first adjustment member 290 is disposed about the bearing carrier 260. The first adjustment member 290 is disposed on or abuts the shoulder 216 and the bearing carrier 260. More specifically, the first adjustment member 290 is disposed on or abuts the second shoulder surface 252 and the second bearing carrier portion 272.

The first adjustment member 290 includes a plurality of first adjustment surfaces 300. The plurality of first adjustment surfaces 300 face towards the piston head 280 and are configured as an inclined stepped ramp. The plurality of first adjustment surfaces 300 are inclined in a first direction.

The second adjustment member 292 is disposed on or abuts the piston head 280. The second adjustment member 292 is disposed annularly about the extension member 282 and includes a plurality of second adjustment surfaces 302. The plurality of second adjustment surfaces 302 face towards the bearing carrier 260 of the bearing assembly 162. The plurality of second adjustment surfaces 302 face towards the plurality of first adjustment surfaces 300. The plurality of second adjustment surfaces 302 are configured as an inclined stepped ramp that is complementary to the inclined stepped ramp of the plurality of first adjustment surfaces 300. The plurality of second adjustment surfaces 302 are inclined in a second direction that is disposed opposite the first direction.

The plurality of first adjustment surfaces 300 and the plurality of second adjustment surfaces 302 are each inclined at an angle substantially similar to the angle of the ramp 204. In at least one embodiment each inclined ramp has the same pitch as the ramp 204.

A portion of the clutch 102, such as a diaphragm spring 110, is configured to engage the bearing assembly 162. The diaphragm spring 110 may apply a load or a force to the bearing assembly 162 such that the protrusion 274 engages and rides along the ramp 204.

Referring to FIGS. 13 and 14, the relative motion between the protrusion 274 and the ramp 204 rotates the piston assembly 164 relative to the bearing assembly 162. In addition, the relative motion between the protrusion 274 and the ramp 204 rotates the piston assembly 164 relative to the second housing member 172 such that the second adjustment member 292 rotates relative to the first adjustment member 290.

The second adjustment member 292 rotates relative to the first adjustment member 290 at least until a first member the plurality of first adjustment surfaces 300 engages a second member the plurality of second adjustment surfaces 302.

Figure 15:
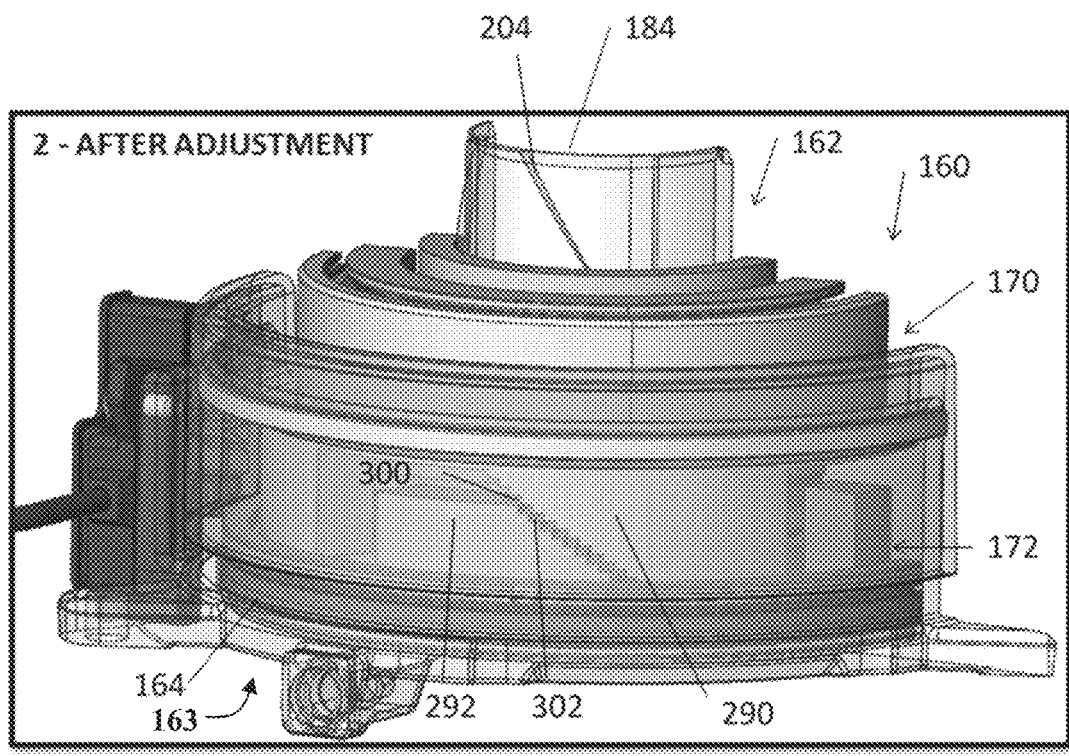
FIG. 15 is a perspective view of the pneumatic clutch actuator of FIG. 13 having the self-adjustment adjustment mechanism after adjustment and before actuation of the pneumatic clutch actuator.
Figure 16:
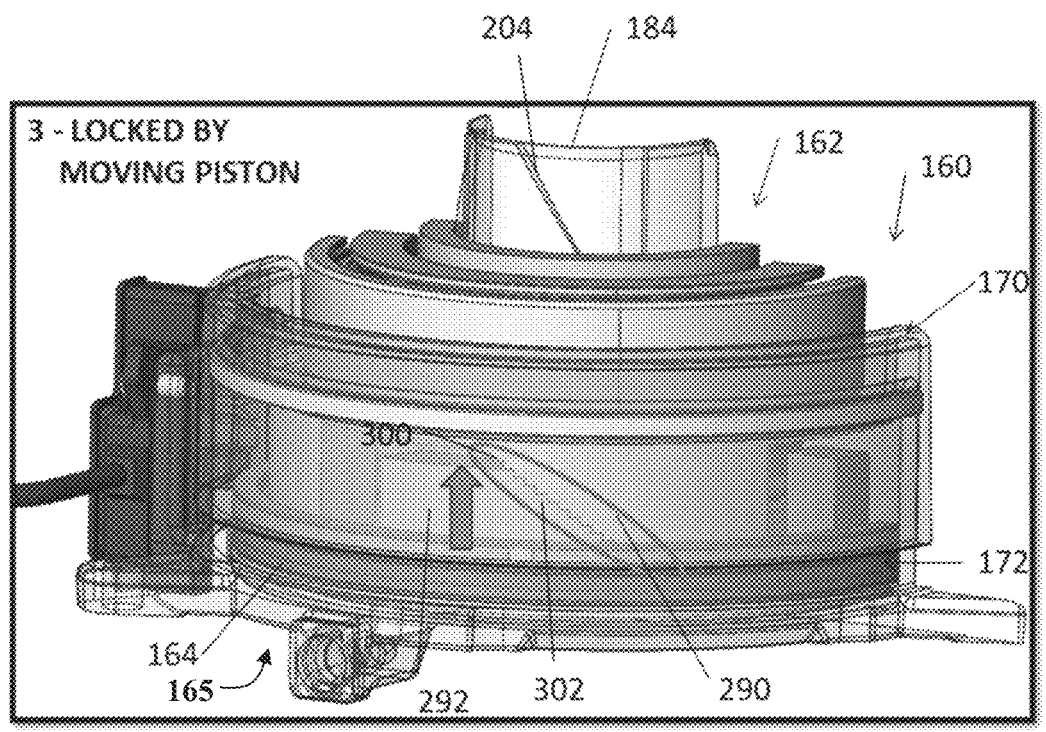
FIG. 16 is a partial cross-sectional view of the pneumatic clutch actuator of FIG. 13 having the self-adjustment adjustment mechanism after adjustment and after actuation of the pneumatic clutch actuator.

Referring to FIGS. 15-17, as compressed air is supplied to the pneumatic clutch actuator 10, the piston assembly 164 moves from the first position towards the second position to disengage the clutch 102. As the piston assembly 164 moves towards the bearing assembly 162, the first member the plurality of first adjustment surfaces 300 engages the second member the plurality of second adjustment surfaces 302. The engagement between the plurality of first adjustment surfaces 300 and the plurality of second adjustment surfaces 302 maintains or adjusts a distance between the piston assembly 164 and the bearing assembly 162 to be within a predetermined distance. A drag torque from the bearing assembly may ensure that an adjustment member of the plurality of the first adjustment surfaces 300 engages an adjustment member of the plurality of the second adjustment surfaces 302 at a highest position such that the dead volume is at a minimum.

Referring to FIGS. 18-27, in some embodiments, the self-adjustment mechanism 166 includes the position locking assembly 34 that is configured to couple the first adjustment member 290 to the second adjustment member 292 as the piston assembly 164 moves towards the bearing assembly 162. In the illustrated embodiment, the first adjustment member 290 includes a plurality of first inclined outer surfaces 312 that extend toward second adjustment member 292. The self-adjustment mechanism 166 includes a plurality of second adjustment members 292 are disposed annularly about the extension member 282. Each second adjustment member 292 is orientated with respect to a corresponding first inclined outer surface 312 and includes a second inclined outer surface 314 that extends toward the first adjustment member 290. Each second inclined outer surface 314 corresponds to a first inclined outer surface 312, and is orientated in an opposing facing relationship with the corresponding first inclined outer surface 312. In one embodiment, one or more second adjustment members 292 includes a support flange 316 that is coupled to a radial outer surface of the second adjustment member 292. The support flange 316 extends towards the first adjustment member 290 and is configured to contact a radial outer surface of the first adjustment member 290 to facilitate maintaining an axial orientation of the first adjustment member 290 along the axis 208 of the transmission input shaft 108.

The position locking assembly 34 includes one or more positioning members 50 and one or more locking members 54. In the illustrated embodiment, each positioning member 50 includes a positioning plate 318, and each locking member 54 includes a locking plate 320. The position locking assembly 34 includes a plurality of positioning members 50 and a plurality of corresponding locking members 54 such that the position locking assembly 34 includes a plurality of positioning plates 318 and a plurality of locking plates 320. Each positioning plate 318 is coupled to a corresponding first inclined outer surface 312, and includes a positioning plate body 322 (shown in FIG. 26) having an outer surface that extends between a first end 324 and an opposite second end 326. The positioning plate body 322 includes an arcuate cross-sectional shape to facilitate coupling the positioning plate 318 to the correspond first inclined outer surface 312 such that the positioning plate 318 is disposed about the bearing carrier 260.

The positioning plate 318 includes a first positioning tab 328 that extends outwardly from the first end 324, and a second positioning tab 330 that extends outwardly from the second end 326. The first and second positioning tabs 328, 330 each include an opening that is sized and shaped to receive a fastener assembly therethrough to facilitate coupling the positioning plate 318 to the first adjustment member 290. In one embodiment, the first and second positioning tabs 328, 330 are oriented obliquely with respect to the positioning plate body 322.

In the illustrated embodiment, the positioning plate 318 includes a plurality of positioning slots 58 that extend through the positioning plate 318. The plurality of positioning slots 58 are spaced along the outer surface of the positioning plate body 322 between the first end 324 and the second end 326.

Each locking plate 320 is coupled to a corresponding second adjustment member 292 and includes a locking plate body 334 (shown in FIG. 27) that extends along the corresponding second inclined outer surface 314. The locking plate body 334 includes an outer surface that extends between a first end 336 and a opposite second end 338, and has an arcuate cross-sectional shape to facilitate coupling the locking plate 320 to the correspond second adjustment member 292 such that the locking plate 320 is disposed about the extension member 282. In the illustrated embodiment each locking plate body 334 has length that is less than the length of the corresponding positioning plate body 322.

The locking plate 320 includes a mounting flange 340 that extends outwardly from the first end 336 and is orientated at an oblique angle with respect to the locking plate body 334. The mounting flange 340 is positioned adjacent to a forward surface 342 (shown in FIG. 18) of the corresponding second adjustment member 292 and includes an opening that is sized and shaped to receive a fastener assembly therethrough to facilitate coupling the locking plate 320 to the corresponding second adjustment member 292. The second end 338 of the locking plate body 334 also includes an opening that is sized and shaped to receive a fastener assembly to facilitate coupling the locking plate 320 to the corresponding second adjustment member 292.

The locking plate 320 includes a plurality of locking flanges 60 that extend outwardly from the outer surface of the locking plate body 334 and towards a corresponding positioning plate 318. The plurality of locking flanges 60 are spaced along the outer surface of the locking plate body 334 between the first end 336 and the second end 338.

Figure 23:
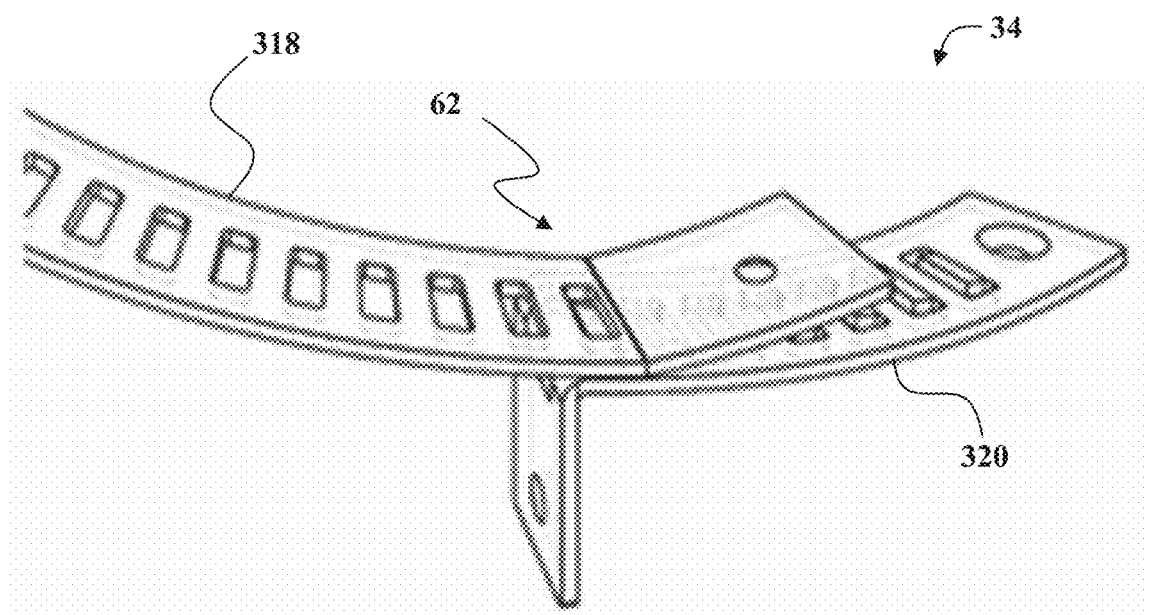
FIG. 23 is a perspective view of the position locking assembly shown in FIG. 22, with the position locking assembly in a locked state.
Figure 24:
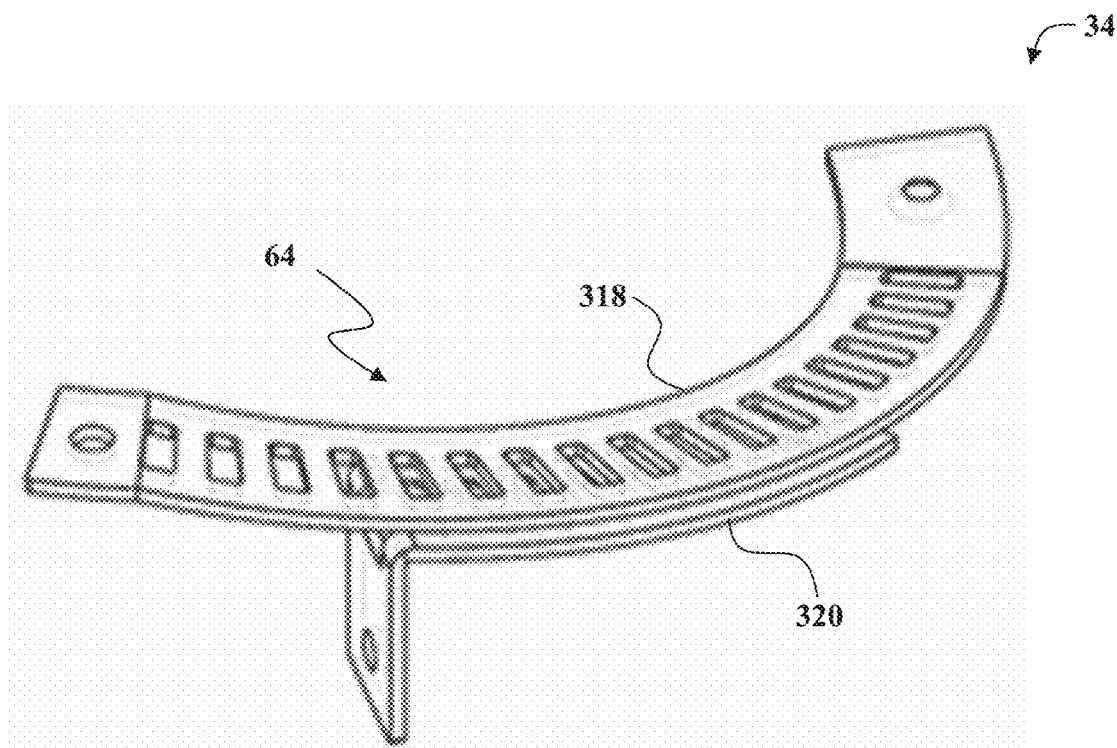
FIG. 24 is another enlarged perspective view of a portion of the position locking assembly shown in FIG. 18, with the position locking assembly in an unlocked state.
Figure 25:
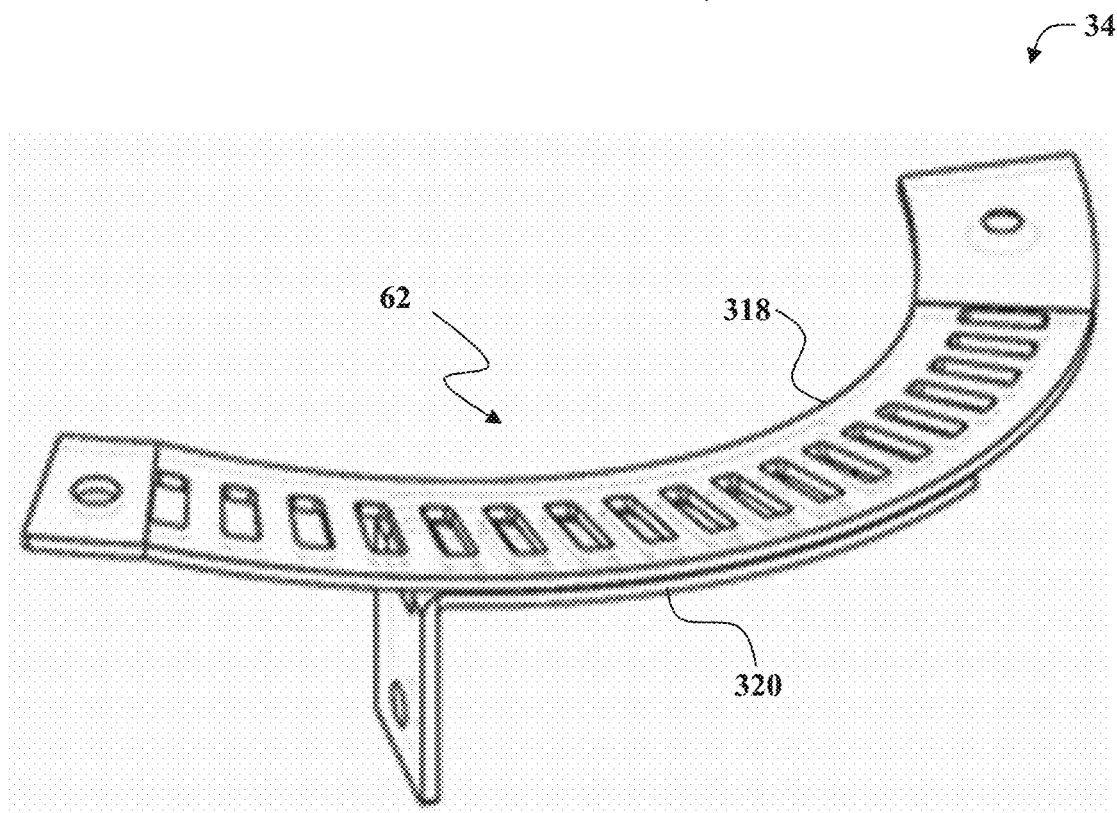
FIG. 25 is a perspective view of the position locking assembly shown in FIG. 24, with the position locking assembly in a locked state.
Figure 26:
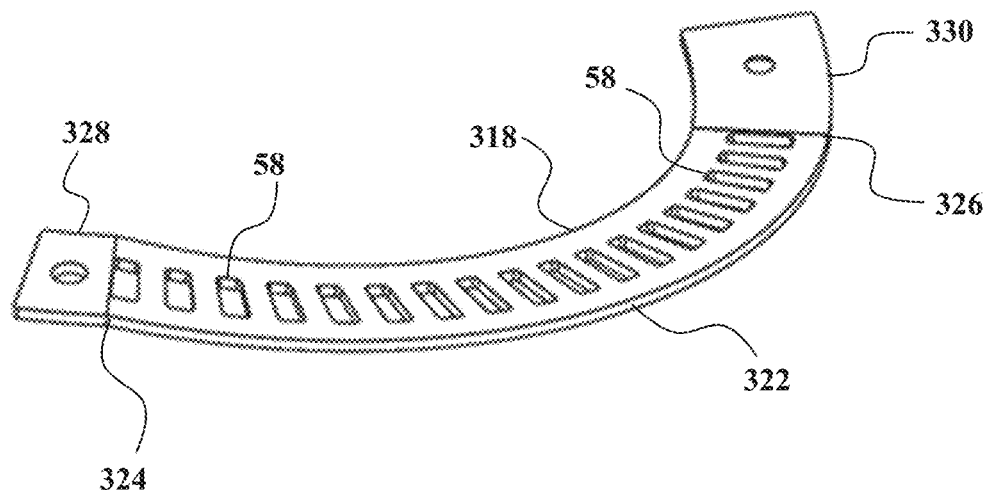
FIG. 26 is a perspective view of a positioning plate that may be used with the position locking assembly shown in FIG. 18, according to an embodiment of the present invention.
Figure 27:
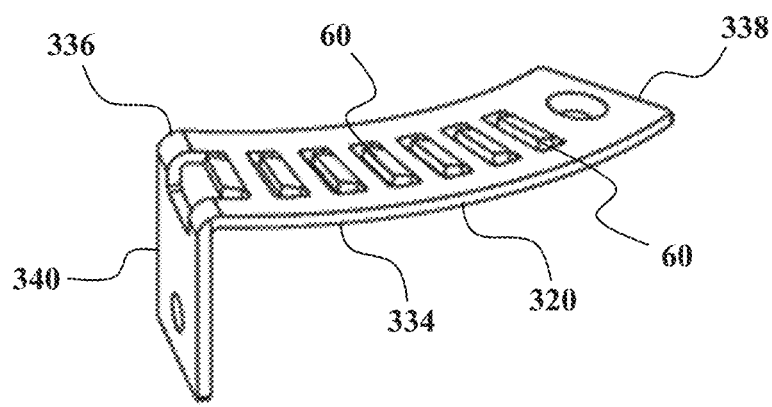
FIG. 27 is a perspective view of a locking plate that may be used with the position locking assembly shown in FIG. 18, according to an embodiment of the present invention.

In the illustrated embodiment, each positioning slot 58 is sized and shaped to receive a locking flange 60 therein to facilitate coupling the first adjustment member 290 to each of the second adjustment members 292 as the piston assembly 164 moves towards the bearing assembly 162. The position locking assembly 34 is positionable between a locked state 62 (shown in FIGS. 23 and 25) with at least one locking flange 60 inserted into a corresponding positioning slot 58 and an unlocked state 64 (shown in FIGS. 22 and 24) with the locking member 54 spaced a distance from the positioning member 50. For example, as shown in FIGS. 23 and 25, as compressed air is provided to the pneumatic clutch actuator 10, the piston assembly 164 moves from the first position towards the bearing assembly 162, which causes the locking plate 320 of each second adjustment member 292 to engage the corresponding positioning plate 318 of the first adjustment member 290 in a locked state 62. When the locking plate 320 engages the positioning plate 318 in the locked state 62, one or more locking flanges 60 of the locking plate 320 are inserted into one or more corresponding positioning slots 58 such that the locking flanges 60 contact an inner surface of the positioning slot 58 to couple the locking plate 320 to the positioning plate 318 to resist a rotation of the piston assembly 164 with respect to the bearing assembly 162.

Figure 18:
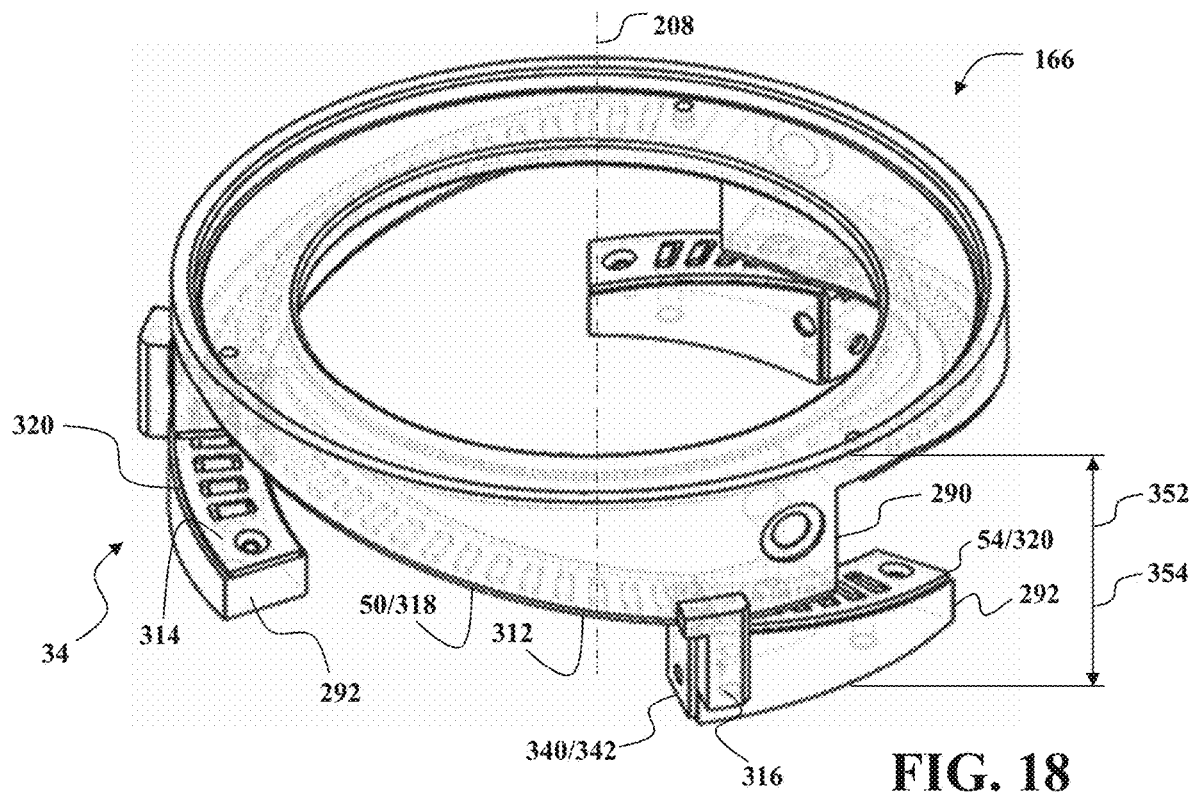
FIGS. 18-21 are perspective views of a position locking assembly that may be used with the self-adjustment adjustment mechanism shown in FIGS. 13-17, according to embodiments of the present invention.
Figure 19:
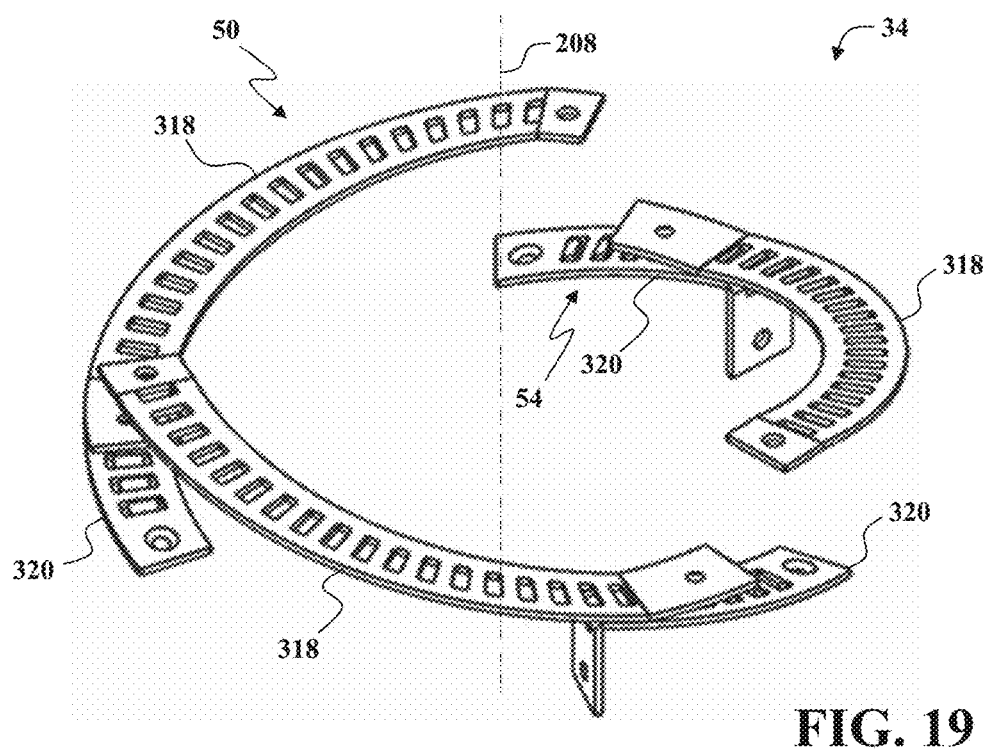
Figure 20:
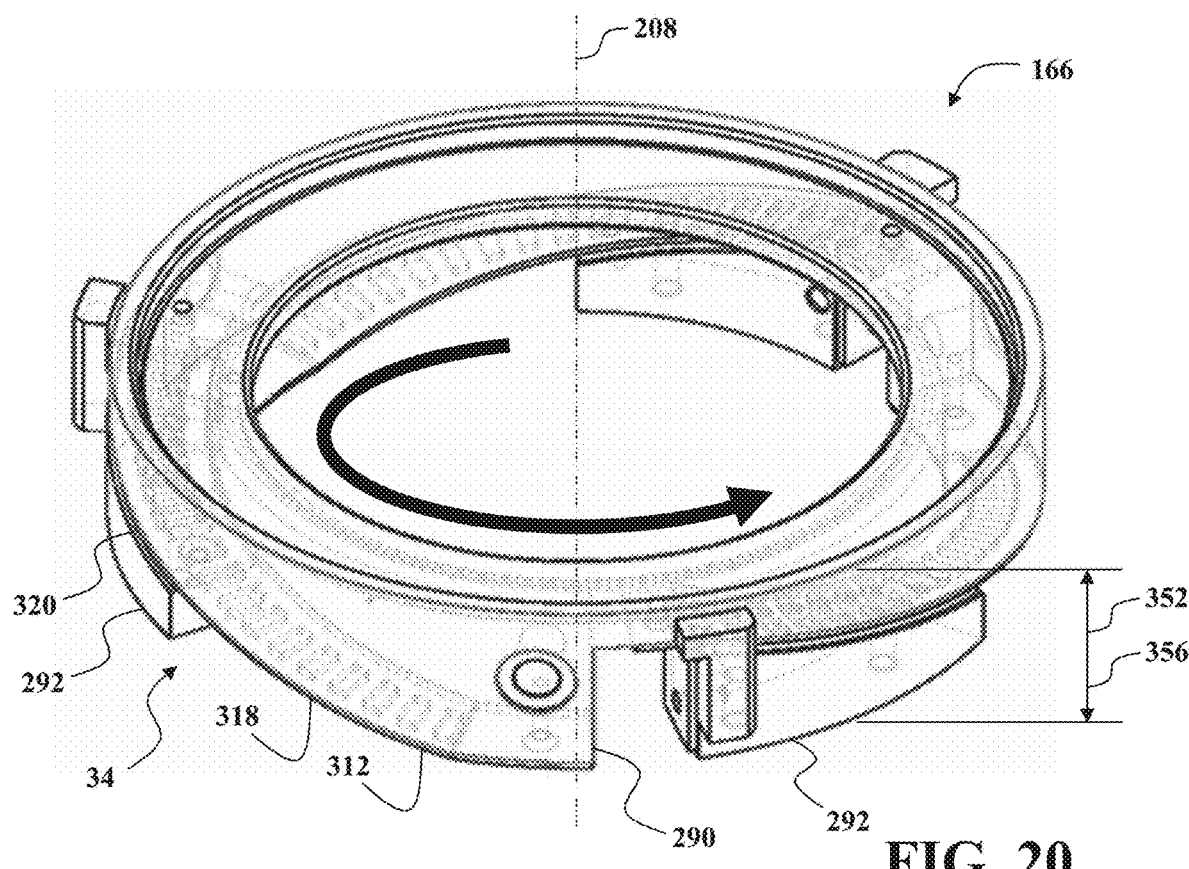
Figure 21:
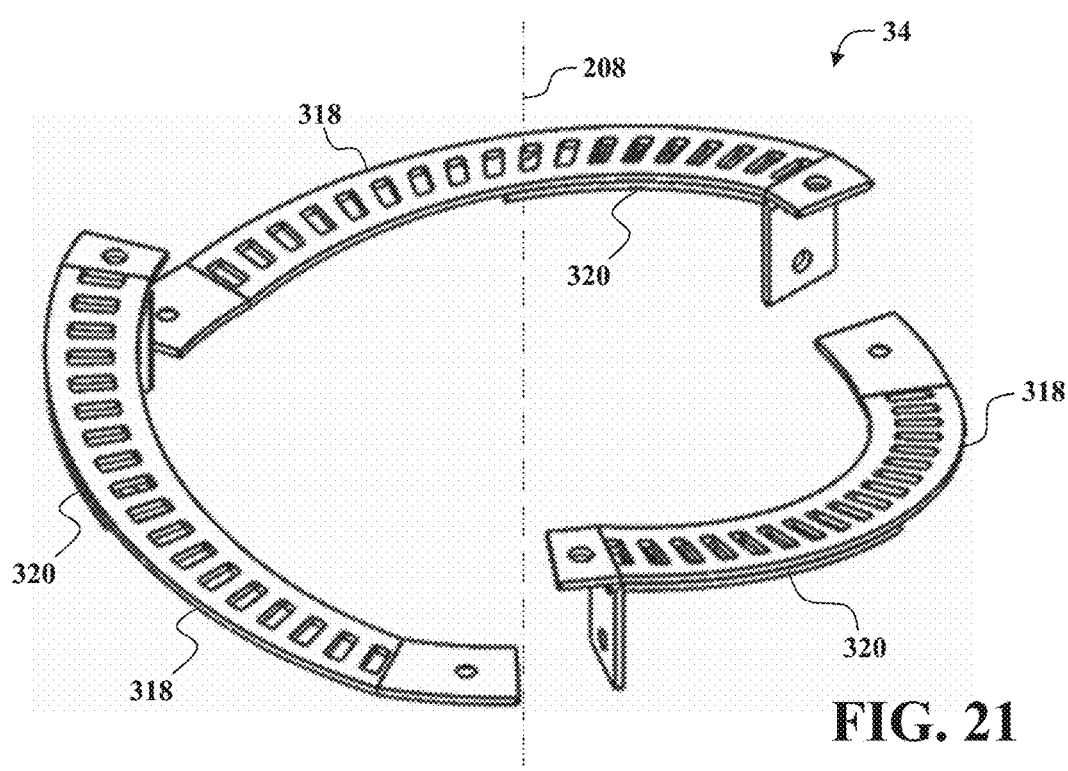
Figure 22:
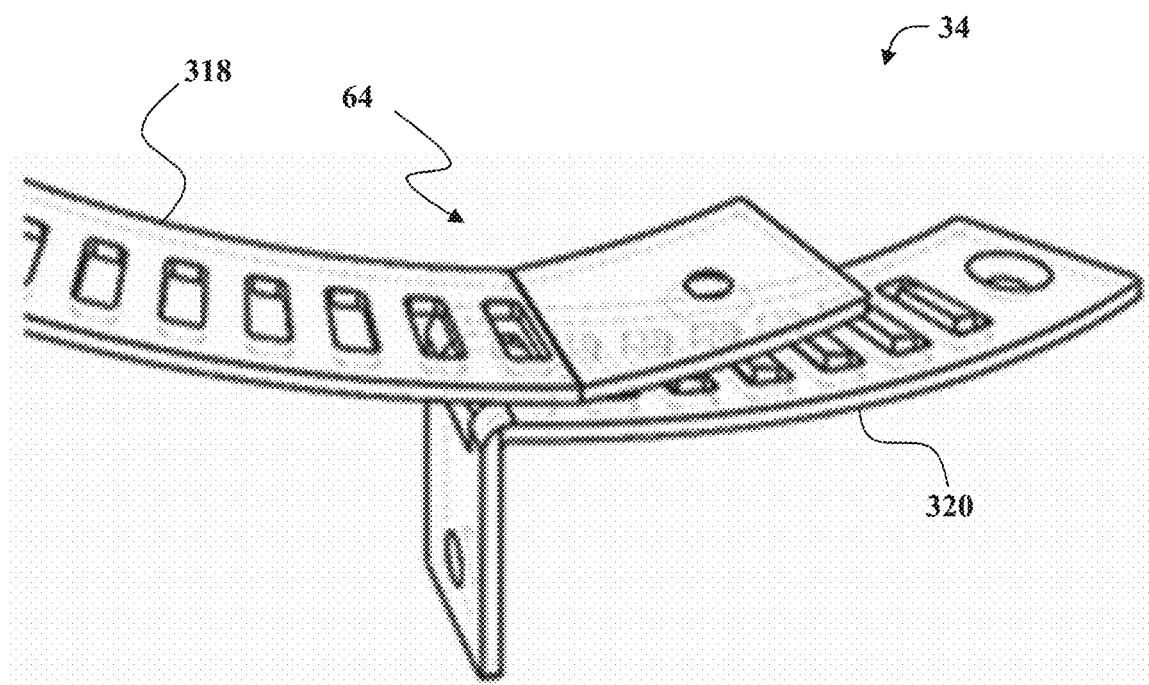
FIG. 22 is an enlarged perspective view of a portion of the position locking assembly shown in FIG. 18, with the position locking assembly in an unlocked state.

The evacuation or releasing of the compressed air from the pneumatic clutch actuator 10 enables the piston assembly 164 to move from the second position towards the first position, and allows the biasing member 284 to bias the piston assembly 164 away from the bearing assembly 162. As the piston assembly 164 moves away from the bearing assembly 162, each locking plate 320 disengages from the corresponding positioning plate 318 and moves to an unlocked state 64. In the unlocked state 64, each locking plate 320 is spaced an axial distance from the corresponding positioning plate 318 to enable the piston assembly 164 to rotate with respect to the bearing assembly 162 to adjust an axial distance 352 (shown in FIGS. 18 and 20) between the piston assembly 164 and the bearing assembly 162. For example, as shown in FIG. 18, during an initial operation of the clutch assembly 100, the first adjustment member 290 is orientated with respect to the second adjustment members 292 such that the pneumatic clutch actuator 10 includes a first axial distance 354 defined between the piston assembly 164 and the bearing assembly 162. Overtime, as the friction surface of the clutch disc 106 wears, the piston assembly 164 rotates with respect to the bearing assembly 162 to adjust the orientation of the first adjustment member 290 with respect to the second adjustment members 292 such that the pneumatic clutch actuator 10 includes a second axial distance 356 (shown in FIG. 20) that is less than the first axial distance 354 to facilitate the greater distance required by the bearing assembly 162 to enable the worn clutch disk 106 to engage the face of the flywheel 104.

In some embodiments, the present invention includes a method of operating the pneumatic clutch actuator 10 to selectively change a clutch state between an engaged state and a disengaged state. The method includes channeling compressed air into the piston housing assembly 160 to cause the piston assembly 164 to move from a first position 163 (shown in FIG. 15) to a second position 165 (shown in FIG. 16), and moving the position locking assembly 34 to a locked state to fix an axial length of the piston assembly 164 as the piston assembly 164 moves from the first position 163. The method also includes releasing compressed air from the piston housing assembly 160 to cause the piston assembly 164 to move from the second position 165 to the first position 163, and moving the position locking assembly 34 to an unlocked state 62 to facilitate adjusting the axial length of the piston assembly 164 as the piston assembly 164 moves toward the first position 163. The method may also include moving the locking member 54 into contact with the positioning member 50 to move the position locking assembly 34 to the locked state 62, and moving the locking member 54 away from the positioning member 50 to move the position locking assembly 34 to the unlocked state 62. The method may also include inserting at least one locking flange 60 into a corresponding positioning slot 58 to move the position locking assembly 34 to the locked state. The method may also include moving the bearing assembly 162 away from the piston assembly 164 to adjust the axial length of the piston as the piston moves towards the first position 163. The method may also include rotating the bearing assembly 162 with respect to the piston assembly 164 as the piston assembly 164 moves towards the first position 163.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A pneumatic clutch actuator, comprising:
   a piston housing; and
   a piston slidably received within said piston housing and configured to selectively change a clutch state between an engaged state and a disengaged state;
   said piston having a self-adjustment mechanism configured to adjust an axial length of said piston with said self-adjustment mechanism including a position locking assembly;
   said position locking assembly having a locking member including a plurality of locking flanges spaced along an outer surface of said locking member; and
   a positioning member including a plurality of positioning slots spaced along said positioning member, each positioning slot configured to receive a locking flange therein;
   wherein said position locking assembly is positionable between an unlocked state with said locking member spaced a distance from said positioning member, and a locked state with at least one locking flange inserted into a corresponding positioning slot.

2. A pneumatic clutch as in claim 1, wherein said locking member further includes a locking disk including said plurality of locking flanges extending outwardly from an outer surface of said locking disk.

3. A pneumatic clutch as in claim 2, wherein said plurality of locking flanges are spaced along a circumference of said locking disk.

4. A pneumatic clutch as in claim 2, wherein said positioning member further includes a positioning ring including said plurality of positioning slots.

5. A pneumatic clutch actuator as in claim 4, wherein said plurality of positioning slots are defined along a radial inner surface of said positioning ring.

6. A pneumatic clutch actuator as in claim 1, wherein said piston further includes:
   a piston assembly;
   an axial tubular extension extending outwardly from said piston assembly along a first axis; and
   a mounting member which is disposed within an end portion of said tubular extension; and
   wherein said self-adjustment mechanism is coupled between said piston assembly and said mounting member for adjusting an axial distance between said piston assembly and said mounting member.

7. A pneumatic clutch actuator as in claim 6, wherein self-adjustment mechanism further includes:
   said position locking assembly positioned within a chamber defined within said piston assembly; and
   a lead screw extending outwardly from said position locking assembly, said lead screw extends into a threaded internal cavity of said mounting member such that a rotation of said lead screw causes a movement of said mounting member along the first axis, said position locking assembly prevents the rotation of said lead screw with the position locking assembly in the locked state.

8. A pneumatic clutch actuator as in claim 1, wherein said self-adjustment mechanism further includes a plurality of locking members, each locking member including a locking plate, said plurality of locking flanges extend outwardly from an outer surface of said locking plate.

9. A pneumatic clutch actuator as in claim 8, wherein said self-adjustment mechanism further includes a plurality of positioning members, each positioning member includes a positioning plate, said plurality of positioning slots extend through said positioning plate.

10. A pneumatic clutch actuator as in claim 9, wherein said piston further includes:
    a bearing assembly; and
    a piston assembly including a piston head and an extension member extending from said piston head towards said bearing assembly; and
    wherein said self-adjustment mechanism is coupled to said piston assembly and said bearing assembly for adjusting an axial distance between said piston assembly and said bearing assembly.

11. A pneumatic clutch actuator as in claim 10, wherein said self-adjustment mechanism further includes a first adjustment member disposed about said bearing assembly, said first adjustment member includes a plurality of first inclined surfaces, each positioning plate is coupled to a corresponding first inclined surface.

12. A pneumatic clutch actuator as in claim 11, wherein said self-adjustment mechanism further includes a plurality of second adjustment members disposed annularly about said extension member, each second adjustment member further includes a second inclined surface extending toward said first adjustment member and orientated in an opposing facing relationship with a corresponding first inclined surface; and
    wherein said each locking plate is coupled to a corresponding second adjustment member.

13. A pneumatic clutch actuator as in claim 10, wherein said piston assembly is configured to rotate with respect to said bearing assembly, said position locking assembly prevents a rotation of said piston assembly with respect to said bearing assembly with said position locking assembly in the locked state.

14. A method of operating a pneumatic clutch actuator to selectively change a clutch state between an engaged state and a disengaged state, the pneumatic clutch actuator including a piston housing and a piston slidably received within the piston housing, the piston including a self-adjustment mechanism for adjusting an axial length of the piston, the self-adjustment mechanism further includes a position locking assembly, said method comprising the steps of:

channeling compressed air into the piston housing to cause the piston to move from a first position to a second position;

moving the position locking assembly to a locked state to fix an axial length of the piston as the piston moves from the first position;

releasing compressed air from the piston housing to cause the piston to move from the second position to the first position; and moving the position locking assembly to an unlocked state to facilitate adjusting the axial length of the piston as the piston moves toward the first position.

15. A method as in claim 14, wherein position locking assembly further includes a locking disk and a positioning ring, said method further comprising the steps of:

moving the locking disk into contact with the positioning ring to move the position locking assembly to the locked state; and moving the locking disk away from the positioning ring to move the position locking assembly to the unlocked state.

16. A method as in claim 15, wherein the locking disk further includes a plurality of locking flanges and the positioning ring further includes a plurality of positioning slots, said method further comprising the step of:

inserting at least one locking flange into a corresponding positioning slot to move the position locking assembly to the locked state.

17. A method as in claim 15, further comprising rotating the locking disk with respect to the positioning ring as the piston moves towards the first position.

18. A method as in any one of claim 15, wherein the piston further includes a piston assembly, an axial tubular extension extending outwardly from the piston assembly, and a mounting member which is disposed within an end portion of the tubular extension, the self-adjustment mechanism further includes the locking disk positioned within the piston assembly and a lead screw extending outwardly from the locking disk and extending into a threaded internal cavity of the mounting member, said method further comprising the step of:

rotating the locking disk and the lead screw with respect to the mounting member as the piston moves towards the first position to adjust the axial length of the piston.

19. A method as in claim 14, wherein the position locking assembly further includes a locking member and a positioning member, said method further comprising the steps of:

moving the locking member into contact with the positioning member to move the position locking assembly to the locked state; and moving the locking member away from the positioning member to move the position locking assembly to the unlocked state.

20. A method as in claim 19, wherein the locking member further includes a plurality of locking flanges and the positioning member further includes a plurality of positioning slots, said method further comprising the step of:

inserting at least one locking flange into a corresponding positioning slot to move the position locking assembly to the locked state.

21. A method as in any one of claim 19, wherein the piston further includes a bearing assembly and a piston assembly, said method further comprising the step of:

moving the bearing assembly away from the piston assembly to adjust the axial length of the piston as the piston moves towards the first position.

22. A method as in claim 21, wherein the positioning member is coupled to the bearing assembly and the locking member is coupled to the piston assembly, said method further comprising the step of:

rotating the bearing assembly with respect to the piston assembly as the piston moves towards the first position.

\* \* \* \* \*